United States Patent

Andrews et al.

[15] 3,651,511

[45] Mar. 21, 1972

[54] TRAVELING MESSAGE DISPLAY

[72] Inventors: Russell W. Andrews, Chicago; Paul M. Kolesar, Hanover Park; Robert M. Payne, Des Plaines; Howard G. Posner, Chicago, all of Ill.

[73] Assignee: Stewart-Warner Corporation, Chicago, Ill.

[22] Filed: Dec. 2, 1969

[21] Appl. No.: 881,546

1.511

Related U.S. Application Data

[62] Division of Ser. No. 703,057, Feb. 5, 1968, now Pat. No. 3,493,956.

[52] U.S. Cl. ..........................340/324 R, 340/154, 340/334

[51] Int. Cl. ..........................G09f 13/00

[58] Field of Search ..............178/15, 30; 340/324, 334, 336, 340/337, 339, 152, 154, 168 SR

[56] References Cited

UNITED STATES PATENTS

| | | | |
|---|---|---|---|
| 3,432,846 | 3/1969 | Jones et al. | 340/324 |
| 3,174,427 | 3/1965 | Taylor | 178/30 |

OTHER PUBLICATIONS

Data Input/Output Rate Control Homiak et al., IBM Tech, Disc. Bull., Vol. 12, No. 4, pp. 610–611, 9/69.

*Primary Examiner*—John W. Caldwell
*Assistant Examiner*—Marshall M. Curtis
*Attorney*—Augustus G. Douvas, William J. Newman and Norton Lesser

[57] ABSTRACT

A completely electronic traveling message display system in which the input data is loaded into a buffer at the rate received and read out to a lamp encoder for actuating the lamps at a rate dependent on but nonsynchronous with the input rate. A control circuit determines the contents of the buffer and controls the readout rate so that a smooth transition is made in the visual display rate despite fast changes in the rate of input. A shift register is shown for sequentially enabling the lamps in a lamp matrix display board and the control circuit controls the shift rate through the register. Provisions are made to fire the lamps a controlled number of times for each shift of the shift register and only for a short period to prevent image distortions to the observer. The brightness of the display is both automatically and manually controllable to adjust for variations in the display rate and for ambient light conditions.

15 Claims, 13 Drawing Figures

INVENTORS
RUSSELL W. ANDREWS
PAUL M. KOLESAR
ROBERT A. PAYNE
HOWARD G. POSNER

By William J. Hausman
ATTORNEY

INVENTORS
RUSSELL W. ANDREWS
PAUL M. KOLESAR
ROBERT A. PAYNE
HOWARD G. POSNER

By [signature]
ATTORNEY

INVENTORS
RUSSELL W. ANDREWS
PAUL M. KOLESAR
ROBERT A. PAYNE
HOWARD G. POSNER

By [signature]
ATTORNEY

INVENTORS
RUSSELL W. ANDREWS
PAUL M. KOLESAR
ROBERT A. PAYNE
HOWARD G. POSNER

By [signature]
ATTORNEY

INVENTORS
RUSSEL W. ANDREWS
PAUL M. KOLESAR
ROBERT A. PAYNE
HOWARD G. POSNER

By [signature]
ATTORNEY

INVENTORS
RUSSELL W. ANDREWS
PAUL M. KOLESAR
ROBERT A. PAYNE
HOWARD G. POSNER

By [signature]
ATTORNEY

ENTORS
RUSSELL W. ANDREWS
PAUL M. KOLESAR
ROBERT A. PAYNE
HOWARD G. POSNER
By
ATTORNEY

INVENTORS
RUSSELL W. ANDREWS
PAUL M. KOLESAR
ROBERT A. PAYNE
HOWARD G. POSNER

By William J. Newman
ATTORNEY

INVENTORS
RUSSELL W. ANDREWS
PAUL M. KOLESAR
ROBERT A. PAYNE
HOWARD G. POSNER

By [signature]
ATTORNEY

TRAVELING MESSAGE DISPLAY

This is a division of U.S. Pat. No. 3,493,956 issued Feb. 3, 1970.

This invention relates to message display systems and particularly to message display systems in which the display is caused to travel across a matrix of display elements to present a continuous flow of information in a natural reading manner.

Matrix type traveling message display systems heretofore known have inherent problems which substantially limit their use to particular applications. They normally comprise a matrix of incandescent light bulbs controlled by electromechanical means such as relay switches and/or perforated tape readers. The desired characters are formed at one side of the light bulb matrix and caused to move across the display in a progressive manner by the electromechanical means. These systems present serious visual distortions which limit their effective use to applications where they are viewed at substantial distances.

Although the visual distortions and the manner in which they are eliminated will be discussed in detail later in the specification, they can be described briefly as optical effects caused by the retention of the image of each energized light bulb on the observer's retina as his eyes move to follow the message across the board. If the display is being viewed from a short focal distance point, the eye turns through a substantial angle during the period each lamp is lit so that the image of each lamp sweeps across a substantial portion of the eye retina to give an elongated effect to the viewer. At longer focal distances, the angle the eye turns through during the energization of each bulb is reduced, thus reducing the visual distortions. Because of this disturbing distortion at the shorter focal distances, however, these systems have generally been limited to outdoor applications such as the news display on the Times Square Building in New York.

The feature by which the distortions are eliminated, as well as many of the other features to be hereinafter discussed, make the described system usable in a variety of different applications. The system is especially adaptable, however, for use in stock brokers' offices, or the like, to display stock market prices and quotations as the information comes in from the stock ticker wire service. This specification, therefore, will be directed mainly to such a stock ticker display system, but this is not to be construed in any manner to limit the application of the inventive features.

Most stock ticker display systems in use today are of the type in which the ticker tape, or a replica thereof, is optically enlarged and projected onto a viewing screen after it is prepared from the incoming wire service signals. Although the moving ticker tape is the most natural type of display from a reading pattern standpoint, there are certain inherent disadvantages in such systems. For example, the projected image of the ticker tape is not particularly easy to read in the bright ambient light conditions normally found in stock brokers' offices. Also, the ticker tape must be prepared from the wire service signals prior to its being optically projected which causes undesirable time lag between the receipt of the information and presentation of the information to the viewing audience. Furthermore, the projection systems are costly to repair and maintain since they are substantially mechanical in nature.

Another type of system has appeared on the market which was designed to simulate the ticker tape display but which removed at least some of the inherent disadvantages of the projection system. This is a mechanical belt type in which display elements are carried on a moving belt upon which the data characters are formed responsive to the input signals. The speed of the moving belt is controlled by the rate of receipt of the incoming data by appropriate servo means. The indicator devices carried by the moving belt are usually made up of mechanical elements such as discs or balls having different reflective surfaces so that data characters may be formed by the contrasting reflective surface display elements on the moving belt. Although the moving belt system presents a natural reading pattern to the viewer similar to the ticker tape projection systems, their mechanical construction presents the same high repair and maintenance costs. Furthermore, the use of reflective display elements make them difficult to read under low ambient light conditions.

The display system disclosed herein and embodying the teachings of this invention is an electronically controlled traveling message system which was designed to simulate the ticker tape projection and traveling belt systems without using any mechanical parts. It presents an easy to read display under all ambient light conditions without any severe visual distortions apparent to the viewer.

The display system comprises a matrix of low transient display devices such as gas discharge lamps arranged in equispaced, vertical columns and horizontal rows. Means are provided to actuate the display elements at one side of the matrix to form display characters and to cause the formed characters to move across the display matrix by sequential shifting from one column to the next at a controlled frequency. In order to minimize the visual distortions hereinbefore mentioned, means are provided for producing strobe pulses to energize the display devices for only a short period of time with respect to the period of shift frequency. If the shift frequency is greater than the flicker fusion frequency of the human eye (the minimum frequency at which the eye can integrate repetitive light pulses into a steady light) then the controlled number of pulses should ordinarily not be more than one pulse per column shift of the characters. If more than one strobe pulse is provided at the higher frequencies, it has been found that multiple images of each column may appear to the viewer as will be described in more detail later. If the shift frequency is below the flicker fusion frequency of the eye, it is advantageous to provide at least two strobes per shift in order to energize the lamps at a rate greater than the flicker fusion frequency to eliminate the appearance of lamp flashing. Multiple strobe pulse can be used at shift frequencies above the flicker fusion frequency under certain circumstances as will be further described later.

The means for sequentially shifting the display characters from column to column comprises a storage device such as a shift register associated with each row of display elements, each of which has a storage stage sequentially corresponding to the devices in the associated row. Display character encoding signals are shifted through the storage device one stage at a time and gated with the strobe pulses to cause the energization of the display devices to form the desired characters.

The data received at the input to the system may be received at varying rates, especially when used as a stock ticker display where the data rate depends on the trading volume of the stock exchanges at the particular time. These receiving rates might change instantaneously for example from 500 characters per minute to 900 characters per minute and back down to some intermittent value or the data may even cease without any smooth transition. Such instantaneous changes in the rate on the traveling message display would be quite irritating to the viewer and provisions are made in the system to smooth out the rate transitions. In the mechanical systems such as the traveling belt type the physical inertia of the mechanical parts of the system slows down the rate changes. In the all electronic system of this invention it must be accomplished electronically and is done by means of a buffer storage device and a timing control circuit. The buffer receives the input data and feeds it through encoding circuits to the sequential shifting storage devices which operate the display elements. The information is read into the buffer from the input source at the rate of data input. However, the information is read out of the buffer at a rate governed by, but not synchronous with, the rate of data input by means of the timing circuit. The timing circuit also controls the strobe pulse producing means and controls the shift frequency so as to synchronize the display. The control means samples the contents of the buffer which is an indication of the rate of receipt of the information from the data source and through a slow time constant analogue circuit varies the buffer readout, the shift frequency and the strobe pulse producing means.

If the receipt of data ceases, the characterdisplay is caused to slow down to a standstill but remain activated until the next display character data is received.

Means are provided for controlling the brightness of the display. Since the human eye is an integrating device the brightness of the display can be varied by varying the on-time to off-time ratio of the display elements. Thus, the intensity of the display can be controlled by controlling the width of the strobe pulses with respect to the period of shift frequency. Provisions are made for manually adjusting the nominal strobe pulse width to change brightness in accordance with ambient light conditions and also for automatically adjusting the strobe pulse width with respect to the nominal setting to control brightness in accordance with the rate of display character display. In addition means are provided for varying the duty cycle in a repetitive manner to produce a flashing effect for attracting the attention of the viewing audience.

The system includes encoding means for translating the received data into usable signals for shifting through the storage devices to actuate the display elements and form the desired characters. The encoder comprises a matrix of encoding elements or gates arranged in a number of rows equal and corresponding to the number of rows of the display board. The gates are also arranged in a number of columns sufficient to form any desired character. The columns of encoder elements or gates are sequentially strobed to provide the encoding signals to the inputs of the storage devices. The encoder column strobing is synchronized with the shifting of the data in the storage devices so that as each column of encoding signals is read in, the signals already contained therein are sequentially shifted through the storage device. The appropriate display devices are then actuated during each data shift period to cause the characters to be formed at one end and shifted across the display board. In order to provide visual spacing between display characters means are provided for shifting the data signals in the storage devices at least one extra stage for each display character entered. Means are also provided for detecting a change from one type of display character to another, such as from numeric characters to alpha characters, and causing the extra shifting means to change the number of extra stage shifts by a predetermined number to provide a different visual spacing between the types of display characters.

The disclosed system and the inventive features thereof will be better understood with a further reading of this specification, especially when taken in view of the accompanying drawings, in which:

FIG. 1 is a view of the traveling message display board with examples of display characters in matrix form thereon;

FIG. 1*a* is a partial view of the display board matrix showing visual distortions present in previously known traveling message boards;

Figure 12:
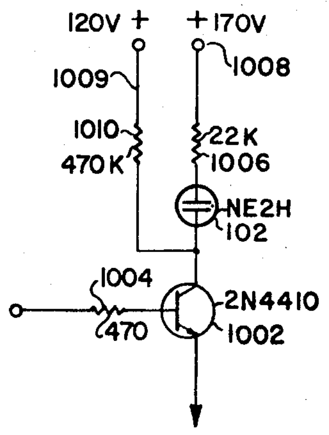
Figure 6:
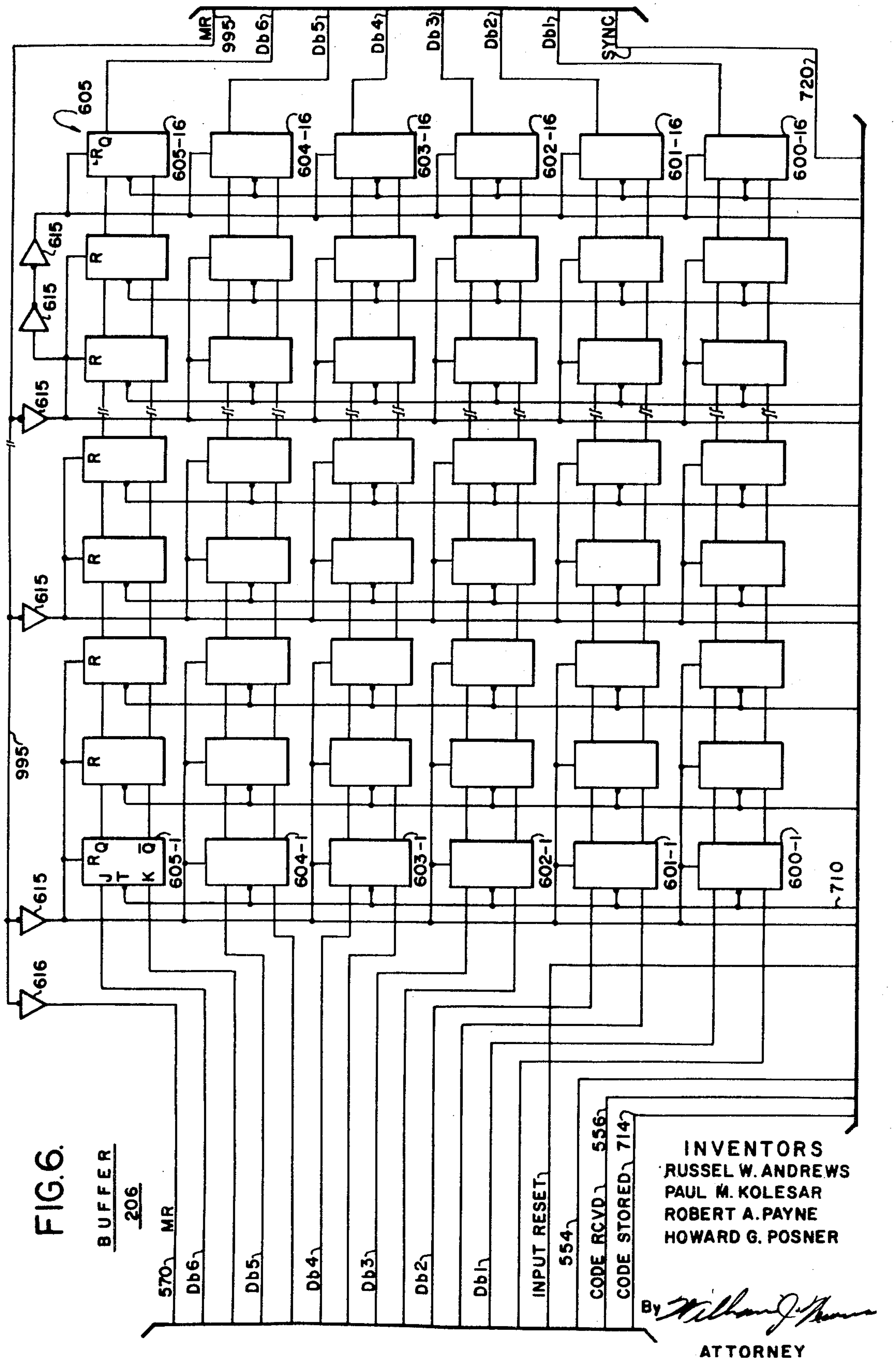
Figure 7:
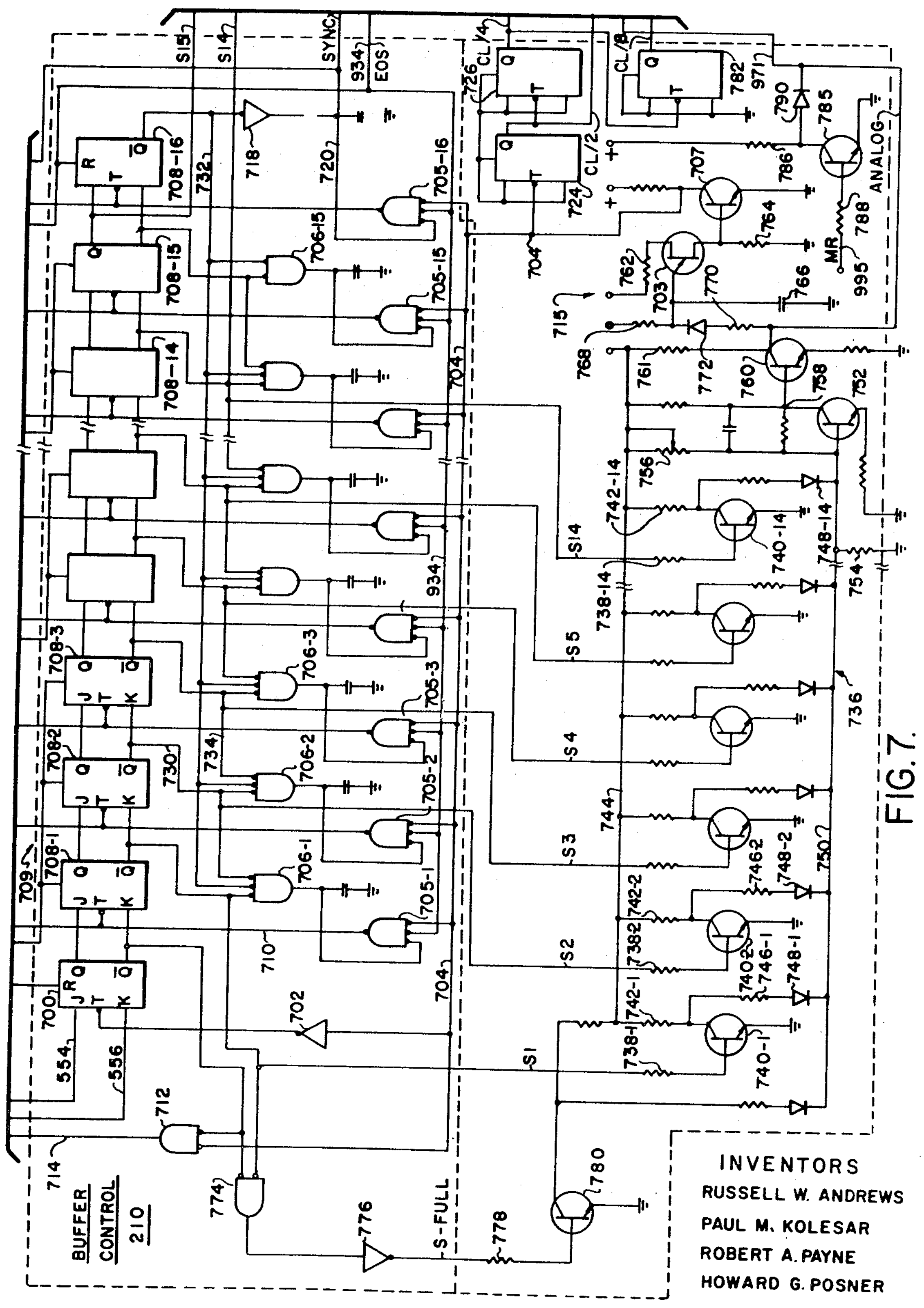
Figures 8, 11:
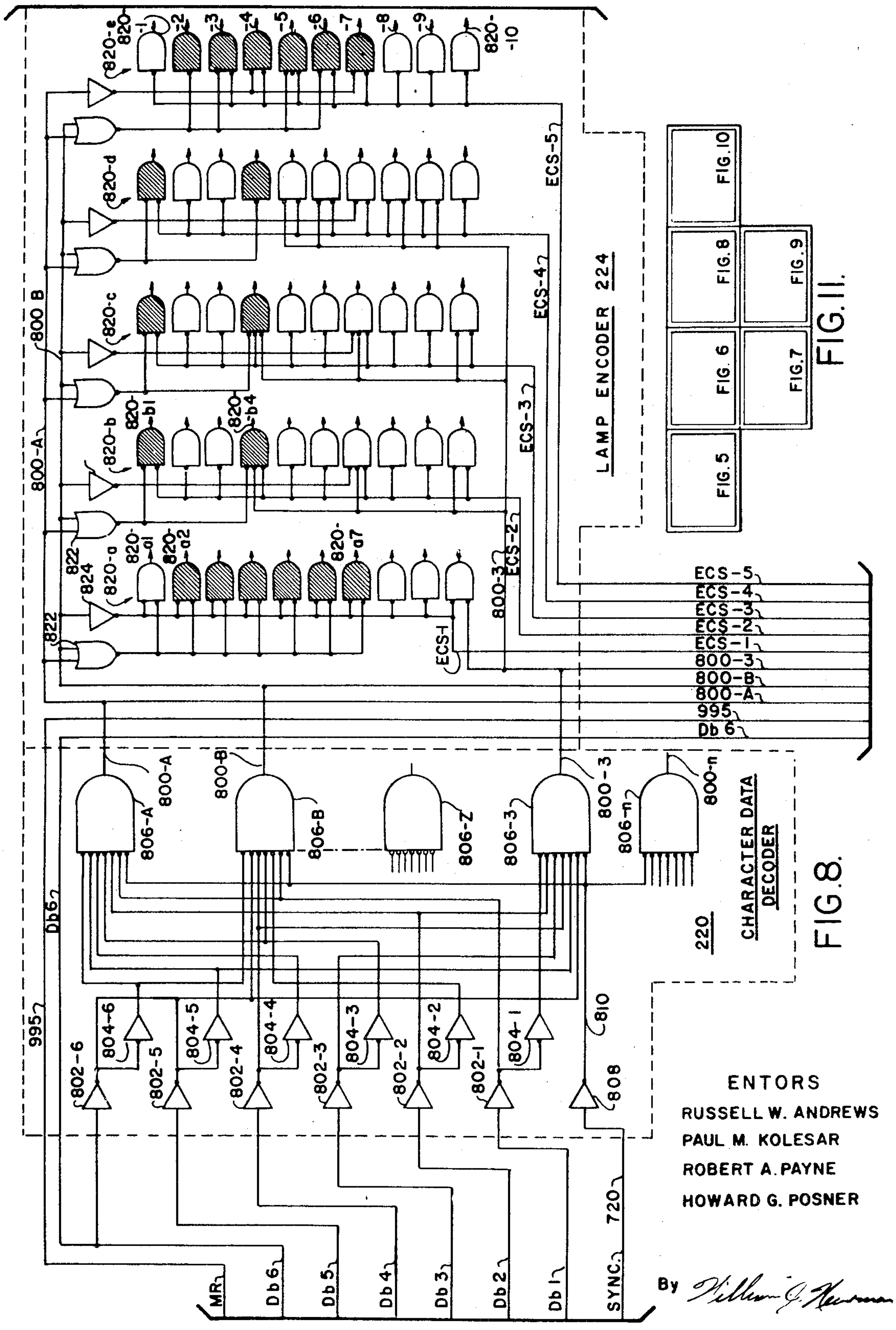

FIGS. 5–10, when interconnected in accordance with FIG. 11, is the schematic diagram of the complete traveling message board system; and FIG. 12 is a schematic diagram of the gas discharge driver circuit.

Figure 1:
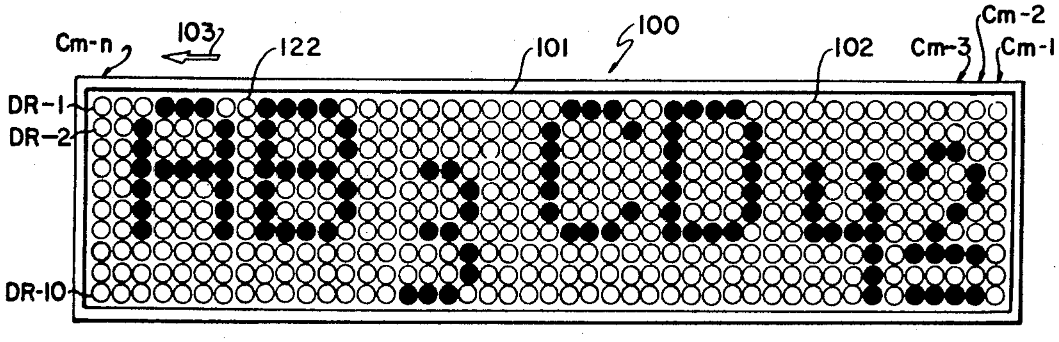
Figure 1A:
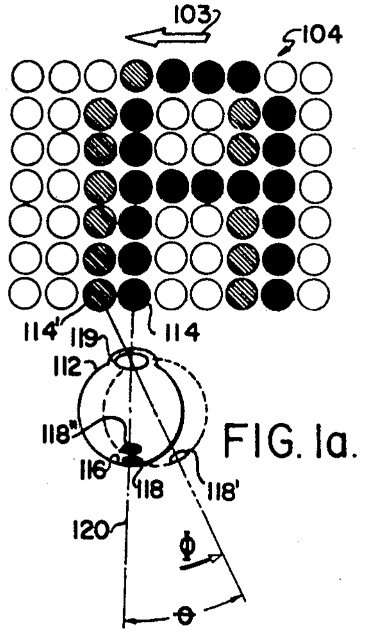

DISPLAY BOARD AND VISUAL EFFECTS –FIGS. 1 and 1*a*

The traveling message display system is designed to display information on a display board 100 having a matrix of display elements 102 which are preferably low transient reacting devices such as gas discharge lamps, mounted in recesses (not shown) in a dull black panel 101. The prototype of the system disclosed utilizes ordinary cold cathode two-element neon bulbs so that the remainder of the specification will generally be directed towards the use of such bulbs. It is recognized, however, that other display elements which have a low transient response might well be substituted.

The lamps 102 are arranged in any number of vertical columns Cm 1, Cm 2...Cm *n* and horizontal rows DR 1–DR 10. The number of columns is selected in accordance with the desired application which ordinarily would be dictated by the amount of information to be displayed at one time, the speed at which the information is to be displayed and the expense of additional lamp columns. The number of horizontal rows in the display is selected in accordance with the desired character configurations. The stock ticker display system shown herein uses a 5 × 7 dot matrix for the formation of alpha characters such as the letters A, B, C, D, and E for the different corporate stock ticker symbols which appear only on the top seven rows DR 1 through DR 7 of the matrix. Numeric characters and other symbols such as 3, 4, and 2 (representing the fraction 2/8) utilized for stock shares and price information are formed generally in a 4 × 7 dot matrix confined to the bottom seven or eight rows of the matrix board. It is of course possible to form all the characters in a single line across the board in which case the bottom three rose DR 8–DR 10 could be eliminated, or the corporate symbol information and the stock share and price information could be further separated than shown by adding additional rows of lamp bulbs. As will be discussed hereinafter, the lamp encoder used herein is adaptable to form any desired character configuration capable of being displayed in dot matrix form, thus giving the system complete flexibility for use in any number of information display applications.

The information travels across the board 100 from right to left in the direction of arrow 103 so that the characters are formed at the rightmost column Cm 1 by actuating the appropriate display elements 102 to successively form each column of the character. For example, to form the letter A, lamps DR 2 to DR 7 of column Cm 1 are energized during the first shift time. The next shift causes lamps DR 2 to DR 7 in column Cm 2 to be lit along with bulbs DR 1 and DR 4 in column Cm 1. The third shift actuates DR 2–DR 7 in column Cm 3, along with bulbs DR 1 and DR 4 in columns Cm 2 and Cm 1. The process continues until the full letter A is formed which is then caused to move across the board in the direction of the arrow 103, one column at a time as described.

Previously known traveling message display systems using matrices of electric lamps have fundamental distortion problems characterized by the apparent broadening of data character components as they travel across the board. One of these is the effect caused by the use of long transient display devices such as incandescent light bulbs. The long extinguishing period of the filaments of such bulbs causes a sort of trailing image of the characters as they travel across the display board. To overcome this, applicant uses fast acting or low transient devices such as gas discharge bulbs as will be later described.

Another problematic distortion, which is perhaps more serious, is the apparent broadening or multiple image effect caused by the movement of the viewer's eyes as he reads the traveling message. Applicants theorize that this phenomenon can be explained in the following manner. In order for the observer's eyes to accommodate the traveling message, the observer's eyeball muscles move the eyeball at a substantially constant speed dependent on the speed of the traveling message. FIG. 1*a* represents this movement as a rotation of the eyeball 112 about an axis through the center of the lens 119 at a constant angular velocity Φ, which of course is only an approximation of the eye's movement. The solid black dots forming the letter A in FIG. 1a represent the stationary position on the matrix at which the letter is formed during one shift period. When those lights first come on the lamp 114 forms an image on the retina 116 of the eyeball 112 at a position represented by first dot position 118 and the principle axis 120 passing through the center of the lens 119. As the eye moves through the angle $\theta$ the portion of the retina first receiving the image moves to the dot position shown at 118'. If the lamps forming the character A are lit after the eye has passed through the angle $\theta$, the retina receives an image of the light 114 at a new position 118''.

The human brain retains light images for at least a short period after the image is removed from the retina, so that if the eye rotates through the angle $\theta$ fast enough, the viewer will get the impression of viewing the dots at both retinal positions 118' and 118''. If the lamps are flashed on once at the beginning of the eye's rotation through the angle $\theta$ and once again at the end thereof, the eye will receive the impression of a double dot image as represented by the shaded dots 114' in FIG. 1*a*. If, however, the lamps are on continuously as the eyeball 112 sweeps through the angle $\theta$, the image presented to the observer will be essentially a bar caused by the image sweeping across the retina from the original retinal position at 118' to the new position 118. The length of the bar, or the space between the double dot image is determined by the rate of rotation $\Phi$ of the eyeball and the time the lamps are lit. The condition shown in FIG. 1*a* is the maximum distortion case in which the lamps are lit once at the beginning of a shift frequency period and once at the end of that period. Thus, two distinct dot images are apparent to the viewer. If the second flash of the lights comes when the eye has rotated through three-quarters of the angle $\theta$, two dots will be seen but they will be overlapping. If, on the other hand, the lights are energized through the total angle $\theta$ or three-quarters of the angle $\theta$, an elongated image of the lamps will appear.

Pursuant to these observations, experiments were performed which indicated that the double or multiple image effect could be prevented by actuating the lamps for only a short period of time during the period between each column shift of the characters on the board. It was found that if the total time period over which the lamps are energized does not exceed approximately 50 percent of the period of the frequency at which the characters are shifted from column to column, the distortions are brought within tolerable limits. That is, if the lamps are only strobed once per shift the strobe duration or duty cycle should not exceed approximately 50 percent of the shift frequency period. If multiple strobe pulses per column shift are used, then the total period from the beginning of the first strobe pulse to the end of the last strobe pulse should not exceed that range.

The lamp duty cycle or lamp on time per column shift may be used to control the brightness of the display characters. The brightness of one or more short flashes of light to an observer depends on the total energy in each flash, i.e., the intensity of each flash multiplied by its duration. Therefore, brightness is controllable by varying the width of the lamp energizing pulses while maintaining the pulse levels constant. This relation holds at least for flashes which have a duration below 0.10 seconds, the brightness of flashes above that duration being dependent on light intensity alone. However, this duration is substantially greater than that which would normally be utilized for most applications of the system. For example, the minimum speed at which information is received from the New York Stock Exchange is about 500 characters per minute. Since most characters utilize six columns for formation (five for the character, one for spacing), a column shift frequency is required of approximately 50 shifts per second. A shift frequency of 50 Hz. has a period of 0.020 seconds so that the flashes would necessarily be much shorter than the 0.10 second maximum duration for control of brightness by varying pulse width. In fact the minimum column shift frequency at which brightness can be controlled by varying the duration of the light flashes is approximately 5 cycles per second which with the display character configuration utilized, would be an information display rate of approximately 100 characters per minute.

The brightness versus light flash duration phenomenon also can pose a problem in the control of brightness with changes in the display information rate changes because such rate changes can have a tendency to cause variations in the lamp duty cycles with respect to the shift frequency period. This problem and the means for overcoming same will be discussed in more detail later.

Another optical problem which must be contended with to provide a pleasing display is the prevention of the appearance of lamp flickering. In other words, as the display characters travel across the board there should be no appearance to the observer that the lamps are pulsing on and off. The human eye is able to blend successive light flashes into a continuous image if the rate of successive flashes is above a certain rate called the flicker fusion frequency. The flicker fusion frequency increases with increasing flash intensities and with decreasing proportions of the light-dark cycle occupied by the flash. The maximum flicker fusion frequency under the optimum conditions is around 50 Hz. and for the prototype device constructed in accordance with this invention, it was found that the flicker is eliminated if the lamps are pulsed more than 40–45 times per second. Since information comes in from the stock market wire services at a rate of 500 characters per minute or greater (50 column shifts/sec.), the lamp flash frequency (assuming they are pulsed only once per column shift) is in excess of the flicker fusion frequency, and the observer ordinarily will not be conscious of the lamp flicker. If, however, the information comes in at a lower rate causing a shift frequency below the flicker fusion frequency, or if the column shift frequency is lowered for any other reason, such as the built-in slowdown feature previously mentioned, flickering is detectable unless additional pulses can be provided to the lamps. The means for providing additional pulses to eliminate the flicker when the column shift frequency drops below the flicker fusion frequency will be hereinafter discussed.

GENERAL DESCRIPTION OF DISPLAY SYSTEM - FIG. 2

Figure 3:
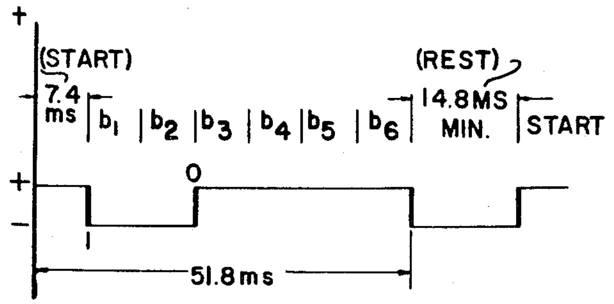
FIG. 3 is a waveform of the type of character data signal useful with the message display board shown herein.
Figure 2:
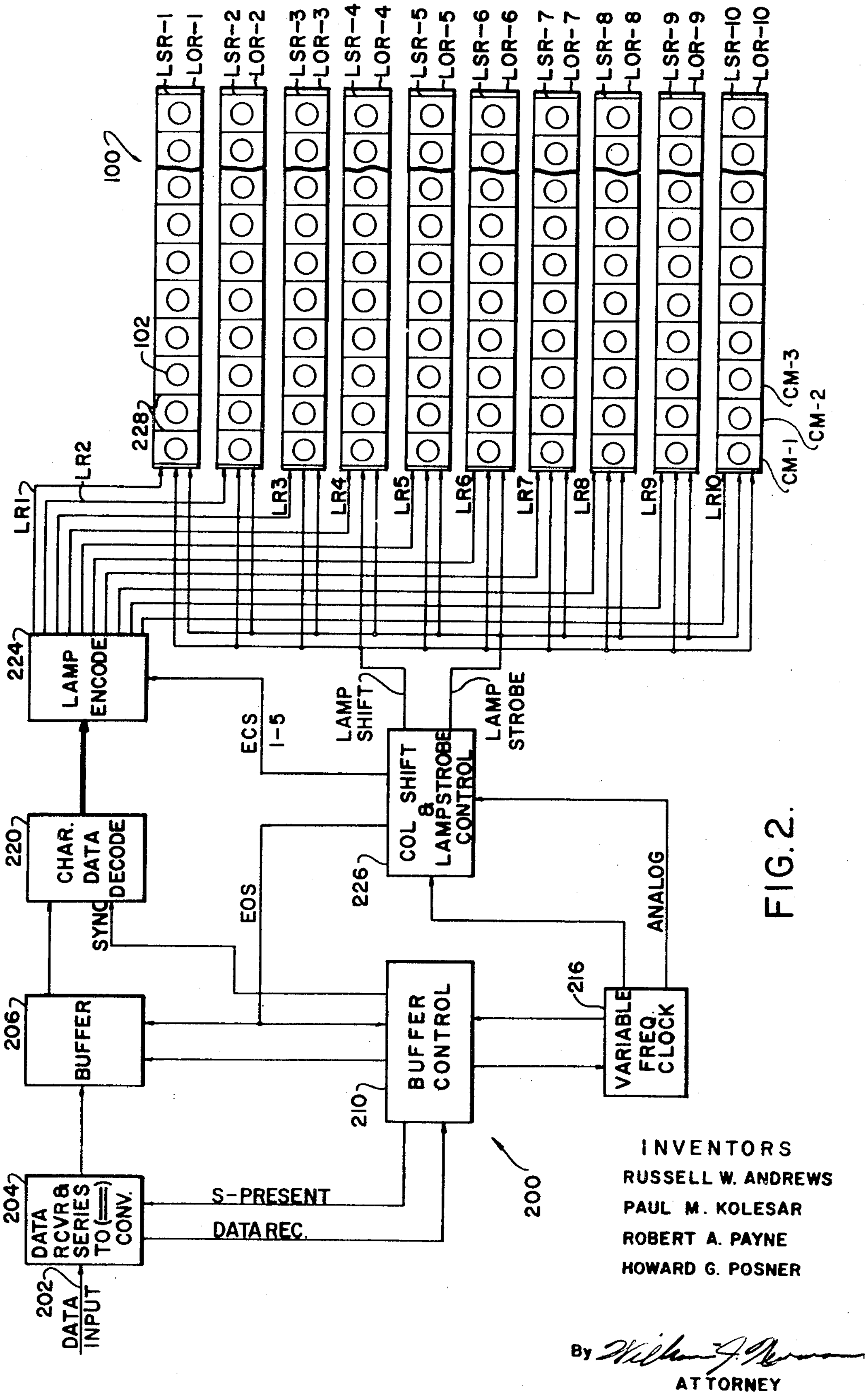
FIG. 2 is a block diagram of the message display system.

The system 200 shown generally in FIG. 2 receives data from an information source through line 202 which in the present embodiment is a two-wire line from the stock market ticker wire service such as the New York Stock Ticker Wire Service. The data comes in to Data Receiver 204 in a series of electric pulses as shown in FIG. 3 which represent bits of a binary code for the display characters as will be described in more detail hereinafter. The Data Receiver 204 includes a Series to Parallel Converter so that all the bits forming the character can be read out to a Buffer Storage Unit 206 at the same time. The buffer 206 is made up of sequential stages and stores the code bits for each display character in parallel fashion in the sequence and at the rate the display character data is received. The Data Receiver also sends a signal to a Buffer Control Circuit 210 indicating that data is received and ready to be stored in the buffer. After the data has been entered, the Buffer Control returns a signal to the Data Receiver to reset the Data Receiver and Series-to-Parallel Converter 204.

The Buffer Control 210 along with a Variable Frequency Clock 216, which serves as the timing control of the system, controls the rate of flow of the data bits through the Buffer 206 and the readout therefrom to the following circuits. The Buffer Control 210 determines the number of characters stored in the Buffer 206, which is an indication of the rate of receipt of incoming information from the data source, and causes the Variable Frequency Clock 216 to vary the rate of data flow and readout from the Buffer in accordance therewith. The variable feature of the Clock 216 has a long and substantially linear transient response so that rapid changes in the rate of data input are smoothed out to a more slowly changing rate of readout from the Buffer.

The data for each character, as it resides in the last stage of the Buffer is decoded by a Character Data Decoder 220 which provides a signal over an appropriate one of a number of conductors to a Lamp Encoder Circuit 224. The number of conductors in the line to the Lamp Encoder is determined by the number of different characters required to be displayed and the number of special functions to be performed.

The Lamp Encoder 224 provides encoding signals on conductors LR 1 through LR 10 to each of 10 Lamp Operating Circuits LOR–1 to LOR–10, each of which controls one of the rows of lamps DR 1–DR 10 on the display board 100. The encoding signals are read out one column at a time simultaneously to each Lamp Operating Circuit so as to actuate each lamp in the column required to form that part of the display character. The column by column readout of the encoding signals from the Lamp Encoder 224 is controlled by Encoder Column Strobe signals from the Column Shift and Lamp Strobe Control circuit 226 which is in turn controlled by the Variable Frequency Clock 216 in a manner to be described later in detail. Thus, the encoding signals are read out to the Lamp Operating Circuits at a rate determined by the rate of receipt of the input data.

The Lamp Operating Circuits LOR–1—LOR–10 each comprise a Shift Register LSR–1—LSR–10, which have stages 228 sequentially associated with each lamp 102 in the associated row. The Column Shift and Lamp Strobe Control 226 provides lamp shift pulses to each of the Lamp Shift Registers to shift the encoding signals from stage to stage in synchronism with the readout of the encoding signals from the Lamp Encoder 224 to the Shift Registers. The encoding signals present in the Shift Register stages prepare circuits to drive the lamps as will be later described.

The Column Shift and Lamp Strobe Control circuit 226 also provides lamp strobe pulses to the Lamp Operating circuits LOR–1 through LOR–10 in order to control the flash duration of the lamps for each column shift of the data in the Lamp Shift Registers. The lamp strobe pulses which are synchronized with the shift pulses actuate the prepared circuits for driving the lamps so that the lamps are lit only for the duration of the strobe pulses. The strobe pulse width is controlled in accordance with an analogue signal from the Variable Frequency Clock which is also a function of the data receipt rate so that the brightness as well as the speed of the display can be controlled in accordance therewith. The Column Shift and Lamp Strobe Control also includes manual controls for varying the strobe pulse width and hence the display brightness.

After the encoding signals for each character has been read into the Lamp Shift Registers and the character formed at the right side of the board, the Column Shift and Lamp Strobe Control 226 provides an End Of Strobe signal to the Buffer Control and the Buffer which serves to cancel the data for the character just displayed and advance the data for the next character into the last stage of the Buffer for readout to the display board.

Figure 4:
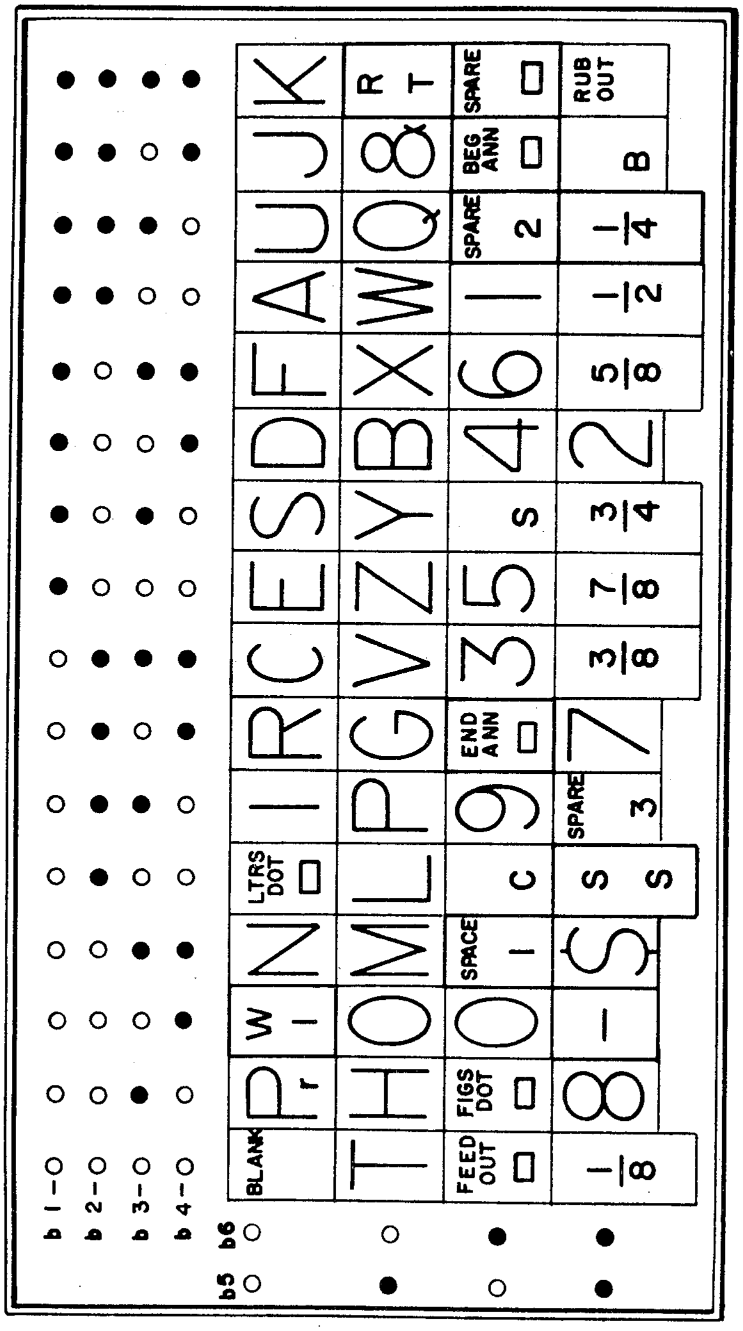
FIG. 4 is a chart indicating the display characters and their associated binary codes.
Figure 5:
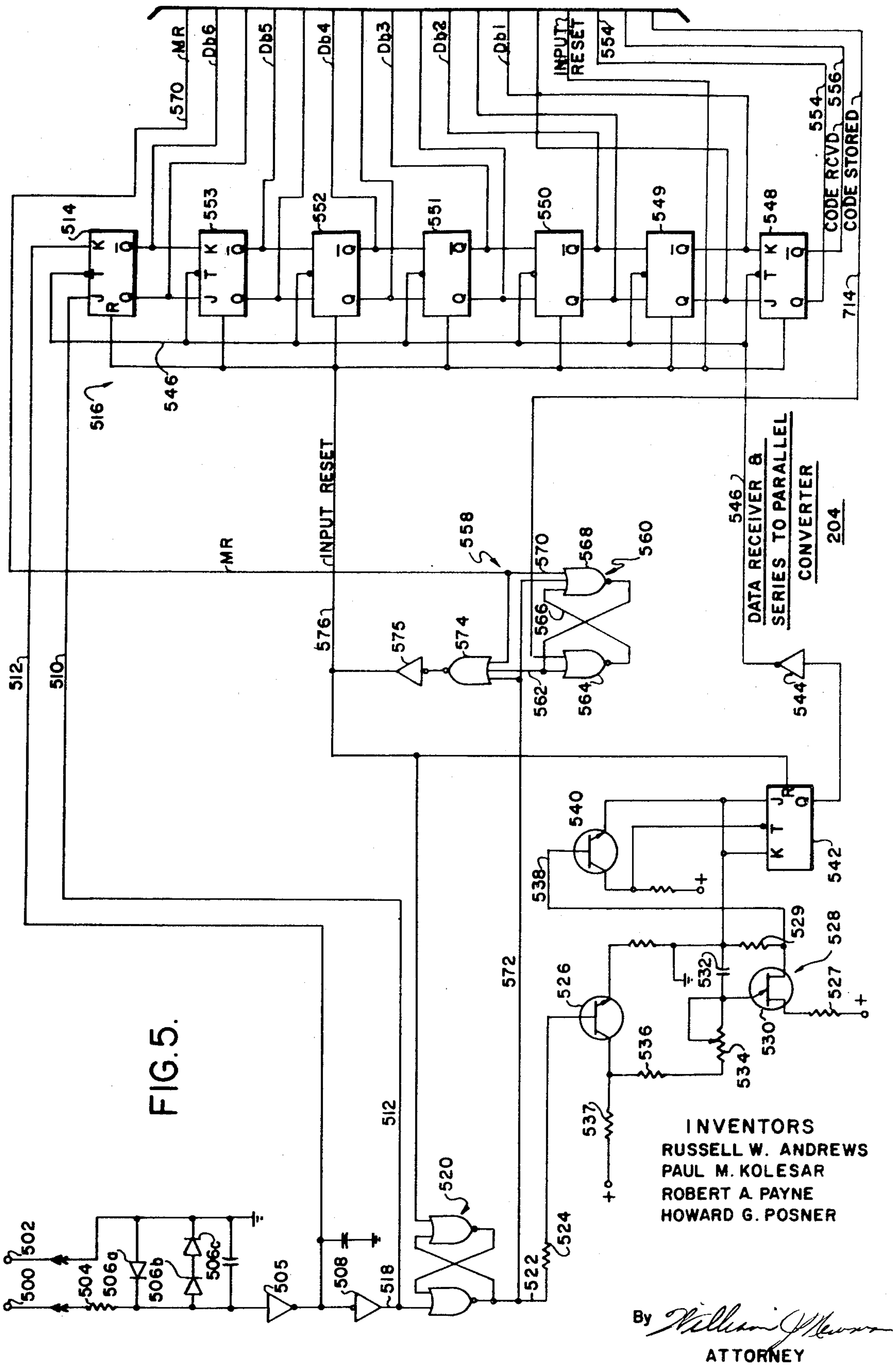

DATA CODES AND INPUTS SIGNAL –FIGS. 3 and 4

The line signals transmitted by the various financial information wire services for coding the display characters are generally of the type shown in FIG. 3. The signal shown is for one character (the letter A) and has a one-unit length start pulse followed by six one-unit length intelligence pulses *b1* through *b6* coded to the desired character. A rest condition is provided subsequent to the *b6* pulse which is two units minimum length. The pulse waveform shown in FIG. 3 is of the type used by the New York Stock Exchange, 900 character per minute ticker network. It is a nine-unit code, each unit being held within small tolerances to 7.4 milliseconds length. No matter what character transmission rate is used, the unit length and the total length from the start pulse through bit *b6* remains constant. In this code a "0" bit is a positive current pulse and a "1" bit is a negative current pulse. The start pulse interval is denoted by a transition from the negative to the positive current condition and the rest pulse interval is denoted by a negative current condition immediately following the sixth intelligent bit *b6*. The rest interval can of course be any length above the minimum 14.8 milliseconds which represents the required length for the maximum character input rate of 900 characters per minute.

The codes used for the different characters and functions as represented by the status of bits *b1* through *b6* are shown in FIG. 4 which shows an approximation of the New York Stock Exchange ticker type box arrangement. The code for any desired character may be determined by the presence or absence of full dots in the *b1* through *b4* positions above the desired character column and the *b5*, *b6* positions to the left of the desired character row. Thus, the code for the alpha character A has a "1" for bit *b1*, a "1" for bit *b2* and a "0" for bits *b3* through *b6*, which character is represented by the waveform shown in FIG. 3. The characters residing in the top two rows of the arrangement of FIG. 4 are used for forming the corporate symbols in the display and hence will be displayed on the top seven rows DR–1 through DR–7 of the display board 100. The characters shown in the bottom two rows in FIG. 4 are used for the security information such as number of shares and prices and hence will be displayed on the bottom seven or eight rows of the display board 100. It will be noted that the codes for the characters in rows 3 and 4 of the arrangement of FIG. 4 are distinguished from the codes for rows 1 and 2 by the presence of a "1" in the *b6* position and this distinction will be used to control spacing between the upper case or corporation symbol characters and the lower case or prices, shares, etc., characters as will be described hereinafter.

DETAILED SYSTEM DESCRIPTION –FIGS. 5–10

The schematic diagram of FIGS. 5 through 10 and the description hereof will be best understood when the drawings are arranged and interconnected with one another in accordance with the diagram of FIG. 11. To facilitate referencing the drawings with the specification, the components in each Figure are numbered with the hundreds and thousands (where required) digit of the number referring to the Figure in which that component is located. Thus, a component with the number 520 will be located in FIG. 5 and number 1020 will be located in FIG. 10. Conductors extending from one Figure to another will be referenced with respect to the Figure in which it is first mentioned in the specification.

DATA RECEIPT AND SERIES TO PARALLEL CONVERSION –FIGS. 5, 6, AND 7

The wire service network data input lines interface with the terminals 500, 502 (FIG. 5) in the Data Receiver and Series-to-Parallel Converter circuit 204. Terminal 502 is connected directly to ground and terminal 500 is connected through a resistor 504 to the input of an inverter or negator circuit 505. A network of diodes 506*a*, 506*b*, 506*c* is connected between the gate input and ground which serve to standardize the amplitude of the code pulses at the input of gate 505. The signal level at terminal 500 is normally low when display character data is not being received so that the output of inverter 505 is normally high with the output of the next inverter 508 being normally low. The outputs of the inverters 508 and 505 are connected via conductors 510, 512 to the J- and K-inputs, respectively, of the first stage of a shift register 516 which serves the function of converting the series received code data to parallel form, as will be described shortly.

It is to be noted that all of the flip-flops shown in the circuit diagrams of FIGS. 5 through 9 with the rectangular configuration are integrated circuits of a well known type which operate responsive to negative going signals at the trigger terminal to shift the polarity status at the J–K input terminals to the respective Q, $\bar{Q}$ output terminals. The circuits can be reset to their low Q-output by a "high" applied to the R-terminal and a low must appear at the R-terminal in order to shift the information through from the input to the output. It is of course recognized that this particular flip-flop configuration is exemplary and that modifications may be easily made for circuits operating under different polarity conditions.

When a start pulse is received from the wire service indicating data for a display character, the signal at terminal 500 goes high causing high and low signals, respectively, on lines 510 and 512 to the J- and K-inputs of flip-flop 514. The flip-flop 514 along with the other flip-flops in the shift register 516 are in their reset or low Q-output condition and will remain that way until a signal is received at the trigger input in spite of the presence of signals at the J- or K-inputs.

The high at the output of inverter 508 caused by the start pulse is also provided to the set input 518 of a norgate flip-flop 520 which had previously been reset at the end of the last received character or by a master reset signal. The output conductor 522 from the flip-flop 520 goes low which is transmitted through a resistor 524 to the base of a transistor 526 cutting it off from its normally conducting condition. The transistor 526 serves as an on-off control for an oscillator circuit 528.

The oscillator 550 is of the basic relaxation type including a unijunction 530 having its two base elements connected respectively through resistors 527 and 529 to a positive voltage source and ground. The unijunction frequency determining emitter circuit includes capacitor 532, potentiometer 534, resistor 536, and resistor 537 extending in series connection between ground and a positive voltage. Thus, transistor 526 acts as a shorting switch across the unijunction emitter circuit to control the operation of the oscillator.

The oscillator 528 is adjusted by means of the potentiometer 534 to oscillate at 270 Hz. The signal on the output conductor 538 of the unijunction oscillator 528 is amplified by transistor 540 and transmitted to the trigger input of a J–K flip-flop 542. The flip-flop 542 being triggered by the low going slope of input pulses to the trigger input thus produces a pulse output of 135 hertz which are sent though negator 544 and conductor 546 to the trigger inputs of each of the flip-flops in the Series-to-Parallel shift register 516. A negative going pulse slope is provided to the trigger inputs every 7.4 milliseconds so as to cause the shift register to shift once during each unit length portion of the incoming character data code group beginning with the start pulse and continuing through the *b*1–*b*6 intelligence pulses (FIG. 3). The status of each bit in the code is presented over conductors 510, 512 to the J- and K-inputs of the first stage 514 of the shift register 516. The bits are shifted through the register by means of the shift pulses on conductor 546 so that at the end of seven shift pulses the character data code will be stored in the shift register 516 with the start pulse being registered in flip-flop 548 as represented by a high at its Q-output and bits *b*1 through *b*6 being registered in flip-flops 549 through 553 and 514 respectively. Thus, for the display character A having the code waveform shown in FIG. 3, at the end of seven shift pulses flip-flops 548, 551, 552, 553 and 514 will have high Q-outputs while flip-flops 549 and 550 will have low Q-outputs.

When the start pulse is registered in the last shift register flip-flop 548 after the seventh shift pulse the Q and $\bar{Q}$ outputs therefrom signify over the code received lines 554, 556 to Buffer Control 210 (FIG. 7) that the character data has been stored in the Series-to-Parallel Converter Register 516 and is ready to be transferred into the Buffer 206. The code received signals also initiate the action to reset the Data Receiver and Series-to-Parallel Converter 204 for the receipt of the next display character data in the following manner.

The code received signals on conductors 554, 556 present a high to the J-input and a low to the K-input of flip-flop 700 in the Buffer Control Circuit 210 (FIG. 7). The trigger input terminal thereof is connected through a negator 702 to a clock line 704 extending from the Variable Frequency Clock 216.

The clock pulses are provided on line 704 by an oscillator 715 including a unijunction 703, the output of which is amplified by transistor 707 and applied to the clock conductor 704. The frequency determining circuits for the oscillator 715 will be described later in the section entitled Buffer Control and Variable Display Rate Operation.

The first positive going slope of a clock pulse appearing on the clock line 704 after receipt of the data received signals on conductors 554,556 causes flip-flop 700 to transfer the data at its input to its Q and $\bar{Q}$ outputs. The next negative going slope of the clock pulse train, applied through a previously prepared And gate 705–1 (to be described in detail later) and conductor 710 then transfers the high Q and low $\bar{Q}$ outputs of flip-flop 700 into a flip-flop 708–1 forming the first stage of a Buffer Control shift register 709. Simultaneously with the shift of the signals into the Buffer Control flip-flop 708–1, the data bits stored in the flip-flops of the Series-to-Parallel Converter shift register 516 are transferred into respective first stage flip-flops 600–1 through 605–1 of Buffer shift registers 600 through 605 since the shift line 710 which triggers the Buffer Control flip-flop 708 also triggers the flip-flops 600–1 through 605–1. Thus, the high Q status of Buffer Control stage 708–1 caused by the start pulse indicates the presence of data in the first stage of the Buffer.

It may be seen that the Q-outputs of each of the stages of the Series-to-Parallel Shift Register 516 are connected to the K-inputs of the respective flip-flops 600–1 through 605–1 in the Buffer with the $\bar{Q}$-outputs of the Shift Register 516 stages connected to the J-inputs of the Buffer input flip-flops so that in the Buffer and succeeding circuits the "0" state in the data character codes is indicated by a low and the "1" condition is represented by a high. These signals are represented by the designation Db 1–Db 6 on the conductors leading to the J-inputs of the first stage flip-flops in the buffer.

The negative going pulse slope which transferred the data bit information into the first stage of the buffer also initiates the Reset circuitry 558 for the Data Receiver and Series to Parallel Converter 204. The negative going clock pulse is nanded at gate 712 with the low appearing at the $\bar{Q}$ output of flip-flop 700 to produce a high signal on the Code Stored conductor 714 leading back to a norgate flip-flop 560 in the Reset circuit 558. The flip-flop 560 is normally in the reset condition with a low on its output conductor 562 and a high on conductor 566 leading to an input of the other NOR-gate 568. Conductor 570 is normally low because it leads from a Master Reset circuit which will be described later, and conductor 572 is low at this time, being connected to the output of the NOR-gate flip-flop 250, which was triggered to its set condition by the start pulse of the display character data. During the period when a display character code group is being received the NOR-gate 574 has lows on all of its inputs thus providing, through negator 575, a low on the input reset conductor 576 to maintain all of the flip-flops in the Data Receiver and Series-to-Parallel Converter 204 in their operable condition. After the code groups has been received and entered into the Buffer the positive going signal on the code stored conductor 714 sets the flip-flop 560 in the reset circuit 558 so that its output conductor 552 goes high and provides a high on the input reset conductor 576. This causes all of the flip-flops in the Shift Register 516 to reset to their low Q-conditions as well as the flip-flop 542 connected to the output of the Data Receiver oscillator 528. The input reset line 576 is also connected to the reset input of the norgate flip-flop 520 thus resetting it to its high output state on conductor 522. This high causes transistor 526 to again conduct which stops the oscillator 528. The resetting of flip-flop 520 also causes the reset of flip-flop 560 by means of the high on conductor 572 to norgate 568.

All of the readout action from the Series-to-Parllel Shift Register 516 to the Buffer 206 and the reset action of the circuit 558 takes place immediately after the start pulse is shifted into the last stage 548 of the Series-to-Parallel Shift Register 516 but before the next shift pulse can be generated by the oscillator 528. Thus, seven shift pulses, and only seven, are transmitted on the shift pulse line 546 to the trigger terminals of the Shift Register 516.

BUFFER STORAGE – FIGS. 6 AND 7

The Buffer 206 performs the function of storing the display character data as it is received from the wire service network in the order that it appears. The buffer permits the information to be read out to the subsequent circuits and onto the display board in a non-synchronous manner with the input of the data from the wire service network so that smooth transmission in the display can be made despite abrupt changes in the rate of receipt of the input data. The remainder of the discussion under this heading will be limited to a description of the flow therethrough of the data for a single display character without any characters immediately preceding or following, and the description will continue with the functioning of the remaining circuits to display that character on the display board. The description of the Buffer and Buffer Control operation when character display data is continuously received will follow in the later section entitled Buffer Control and Variable Display Rate Operation.

The Buffer 206 comprises a set of six shift registers 600 through 605, one for each data bit of the display character data code. The shift registers are formed of integrated circuit JK flip-flops with the flip-flops 600–605 forming the input stages to each respective register. The Buffer shift registers each contain a number of stages determined by the character rate the system is designed for and the amount of smoothing required for a pleasing display. In the prototype unit, designed to operate from the New York Stock Exchange wire services, a 16-stage Buffer suitably handles all of the data without loosing any characters.

The manner in which the data bit signals Db 1–Db 6 are read from the Series-to-Parallel Shift Register 516 to the input stages 600–605 of the Buffer and the manner in which the start pulse was read into the input stage 700 of the Buffer Control Shift Register 709 by a clock pulse was described in the last section. Each succeeding pulse on the clock line 704 will shift the data to the next succeeding stage provided there is no display character data in the next succeeding buffer stage. This is detected by circuits including gates 705–1 through 605–16 and gates 706–1 through 706–15 which test the status of the Buffer control shift register flip-flops for the presence of a Start pulse in a manner to be described in the Buffer Control section. When the character data reaches the last stage of the Buffer the presence of the Start pulse associated therewith in the last stage of the shift register 709 causes a low at the Q̄ output of flip-flop 708–16. That low is inverted by negator 718 and the high therefrom is applied to a NAND-gate 705–16 closing it to prevent clock pulses on the clock conductor 704 from reaching the trigger input of the last stage 708–16 of the Buffer Control shift register and the trigger inputs of the last stages 600–16 through 605–16 of the Buffer 206. The character data is thus stopped in the last stage of the Buffer where it will remain until it is decoded by the Character Data Decoder, converted into usable signals by the Lamp Encoder 224 and read onto the first columns of the Display Board 100. When the character has been read onto the board each of the Buffer output stages 600–16 through 605–16 and the Buffer Control shift register final stage 708–16 receives a reset signal, in a manner to be hereinafter described, which cancels the information therein and prepares them for the receipt of the next character.

CHARACTER DATA DECODING AND LAMP ENCODING – FIGS. 8 AND 10

The display character code data bits Db 1–Db 6 appearing at the Q-outputs of the last stage flip-flops 600–16 through 605–16 of the buffer are presented to the Character Data Decoder 220 which establishes a single conductor signal on one of its output conductors 800–A, 800–b... 800–3...800–N of which there exists one for each desired character to be displayed. Each of the data bit lines Db 1–Db 6 is connected through one or two negators of the sets including 802–1 through 802–6 and 804–1 through 804–6, to each of a plurality of NAND-gates 806–A, 806–B...806–3...**806–*n*, one of which exists for each of the characters to be displayed. To illustrate for the example character letter A, the Db 1 conductor from the Buffer output flip-flop 600–16 carries a high (representative of a "1") which is changed to a low by negator 802–1 and presented to one input of the A NAND-gate 806–A. Likewise the Db 2 conductor carries a high which is inverted by negator 802–1 and presented as a low to the gate 806–A. The data bit Db 3, however, is a low at the Q-output of buffer last stage flip-flop 602–16 which is inverted by negator 802–3 and reinverted by negator 804–3 to present another low to the A NAND-gate 806–A. Data bits Db 4, Db 5, Db 6 are also low and, hence, are double inverted by their respective negators 802–4 through 802–6 and 804–4, 804–6 to present lows to the A-gate 806–A. Data bits Db 4, Db 5, Db 6 are also low and, hence, are double inverted by their respective negators 802–4 through 802–6 and 804–4, 804–6 to present lows to the A-gate 806–A. This satisfies six of the seven inputs to the A-gate, and the seventh input is satisfied by a Sync signal which is derived from the low appearing at the Q̄ output of the final stage 708–16 of the Buffer Control shift register 709. It is converted to a high by the negator 718 and carried on the Sync line 720 to a negator 808 in the Character Data Decoder 220, the low therefrom being applied to the gate 806–A as well as all of the other display character gates. The lows at all of the inputs to gate 806–A open it to produce a high on the A-conductor 800–A leading to the Lamp Encoder 224. The various inputs to the gates 806–B and 806–3 can also be traced to show that they are satisfied when the code signals carried by the conductors Db 1 through Db 6** are representative of those characters.

The Lamp Encoder circuit 224 produces the lamp encode signals which are transmitted to the Lamp Operating circuits LOR–1 through LOR–10. The Lamp Encoder comprises a matrix of Nandgates 820 arranged in rows 820–1 through 820–10 corresponding to the 10 rows of lamps DR–1 through DR–10 on the display board. The gates are also arranged in columns **820–*a*, through 820–*e*** which correspond to the columns required to form any desired display character. In the prototype system disclosed herein the characters are formed in matrices having four and five lamp columns so that five columns of gates are used. It is obvious that other character matrices can be used which would require different numbers of columns of gates equal to the maximum number of columns in the widest character.

Figure 10:
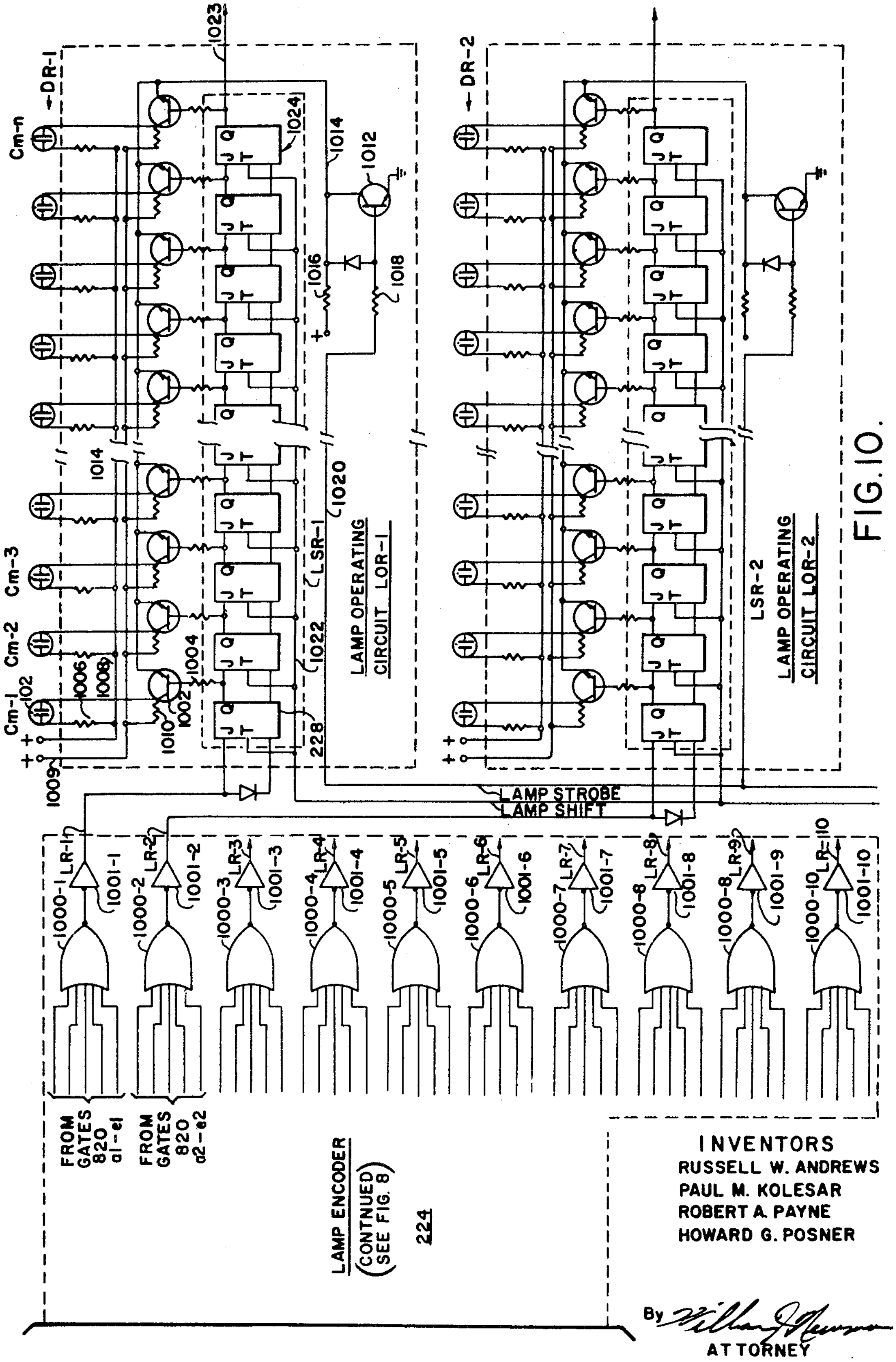

The outputs from each of the first row gates **820–*a*1 through 820–*e*1 are connected to a separate input of a row 1 NOR-gate 1000–1 (FIG. 10). Likewise each of the gates in the rows 820–2 through 820–10 are connected to the inputs of respective row NOR-gates 1000–2 through 1000–10**. The inverted outputs of these NOR-gates provide the LR–1 through LR–10 signals which are fed to the Lamp Operating Circuits LOR–1 through LOR–10.

The single line conductors 800–A, 800–B, etc., from the Character Decoder NAND gates are each connected through NOR-gates 822 and/or negators 824 to appropriate encoder gates 820 in the matrix to produce the proper encoding signals for forming the desired character. For example, to form the previously exampled A indicated by a high on single line conductor 800–A, the following NAND gates are prepared by receiving low signals through the NOR-gates 822; **820–*a*2 through 820–*a*7, 820–*b*1, 820–*b*4, 820–*c*1 820–*c*4, 820–*d*1, 820–*d*4, and 820–*e*2 through 820–*e*7. These gates have been crosshatched with light lines descending from left to right and it may be seen that these gates actually from left to right and it may be seen that these gates actually form a crude representation of the letter A. The circuit for the numeric character "3," which is to appear on the bottom seven rows DR 4 through DR–10 of the display, may also be traced to the matrix of gates in the Lamp Encoder by following the single line conductor 800–3 leading from the output of the Data Character Decoder NAND-gate 806–3. These encoder gates have been crosshatched by light lines descending from right to left in FIG. 8. This character is only four columns wide so that gates only in columns 820*a* through 820*d* are prepared by the signal on the single line conductor 800–3**.

The encoder gates 820 having been prepared in accordance with the single line conductor signal from the desired Character Decoder NAND gate are ready to receive readout signals. The readout signals comprise a series of sequenced Encoder Column Strobe pulses, one each on lines ECS–1 through ECS–5 extending from the Column Shift and Lamp Strobe Control circuit 226. Thus, the ECS–1 pulse sends the appropriate signals for the first column of the letter through the appropriate first column encoder gates **820–*a*1 through 820–*a*10, norgates 1000–1 through 1000–10 and negators 1001–1 through 1001–10 to the first stages of the appropriate Lamp Shift Registers LSR–1 through LSR–10. A Lamp Strobe Pulse is then applied to light the associated lamps in Display Column Cm 1. An encoder Column Strobe pulse then occurs on the ECS 2 line leading to the second column of nandgates 820–*b* to read out the signal through the appropriate gates to the Lamp Shift Registers. When the second column signals are read into the input stages of the Lamp Shift Registers the first column signals are shifted to the second stages. This is accomplished by the synchronization of the Encoder Column Strobe pulses with the Lamp Shift pulses applied to the Lamp Shift Register as will be explained hereinafter. A Lamp Strobe Pulse then occurs to light the appropriate lamps in the first two lamp columns Cm 1, Cm 2. Likewise, the Encoder NAND gate columns 820*c*** through *e* are sequentially opened by the encoder Column Strobe pulses on the ECS–3 through ECS–5 conductors to read out the column signals for forming the remainder of the desired character at the edge of the Display Board. The operation of the Lamp Operating Circuits in FIG. 10 will be explained in more detail in the next section of this specification.

The Lamp Encoder used herein is a highly flexible circuit which enables the use of an almost infinite variety of character types and formations. To change the formation of any particular character the output from the particular character decoder nandgate need merely be connected to the desired NAND gates in the encoder matrix.

LAMP OPERATING CIRCUITS – FIG. 10

The Lamp Operating circuits LOR–1 through LOR–10, only two of which are shown in FIG. 10, each comprise the previously mentioned Lamp Shift Registers LSR–1 through LSR–10 made up of integrated circuit flip-flops which may be, but are not necessarily, of the type utilized in the other shift registers in the system. An NPN-drive transistor 1002 for driving an associated lamp 102 is connected to the output of each shift register stage flip-flop by means of a resistor 1004 between the base of the transistor and the Q-output of the respective flip-flop. The lamp 102 which is a low transient type such as a cold cathode neon bulb is series connected with a resistor 1006 between the collector of transistor 1002 and a positive high voltage conductor 1008. Another resistor 1010 parallels the series connected lamp 102 and resistor 1006 to another voltage source conductor 1009 having a lower voltage.

The emitter of transistor 1002 is connected with the emitters of the drive transistors associated with the other stages in the particular Lamp Operating Circuit to the collector of a strobe transistor 1012 via conductor 1014. The collector of strobe transistor 1012 is also connected through a resistor 1016 to a positive voltage source and has its emitter connected to ground. Its base is connected through a resistor 1018 to the Strobe Pulse line 1020 leading from the Column Shift and Lamp Strobe Control 226.

The voltage on conductor 1009 and the value of resistor 1010 is chosen to maintain the voltage across the bulb 102 below its sustaining level when the transistor is off and conducting only minority carrier current. In addition, they are selected to maintain a low minority carrier current power dissipation across the collector base junction of the transistor. By using the component values and voltages for the drive circuit shown in FIG. 12, a drive transistor having a voltage rating of only 80 volts and a power dissipation ration of only 310 milliwatts was usable. Since the actual minority carrier current power dissipation is only in the range less than 10 milliwatts, the deterioration of the transistor is minimized.

As mentioned in the last section, the lamp encoding signals appearing on conductors LR–1 through LR–10 are applied to the input stages of the Lamp Shift Registers LSR–1 through LSR–10. A high signal appearing on any of the conductors LR–1 through LR–10, of course, indicates that the lamp in the associated row is required to be lit to form the desired character and that signal must be shifted from stage to stage of the Lamp Shift Register to sequentially light the lamps in that row in a column by column manner to create the visual impression of the character moving across the board. Thus, as each column of information for the particular display character is received over the lines LR–1 through LR–10 to the first stage of the Lamp Shift Register, the information is read into the first stages by the negative going sloped pulse on the Shift Pulse Line 1022 leading from the Column Shift and Lamp Strobe Control to the trigger inputs of each of the flip-flops in the shift registers. The information then appears at the Q-outputs of the first stage flip-flops, and, if the lamp 102 associated with that stage is to be lit, the high Q-output applied to the base of the associated drive transistor 1002 prepares that transistor for conduction. Shortly thereafter the circuit for the transistor 1002 and, hence, the lamp 102 is completed by the receipt of a Lamp Strobe pulse on conductor 1020 which triggers strobe transistor 1012 into conduction. This circuit may be traced from ground through transistor 1012, conductor 1014, transistor 1002, light bulb 102 and resistor 1006 to the high voltage conductor 1008. The duration of the light flash of bulb 102 is determined by the pulse duration of the strobe pulse on conductor 1020, and it is the use of a strobe pulse and the control of the strobe pulse duration which leads to the elimination of the distorted images and the brightness control features previously described.

After the strobe pulse has fired the lamps, new encoding signals appear on the conductors LR–1 through LR–10 for the next column of lamps to form the character. A shift pulse appears on conductor 1022 which shifts the previous signals to their next succeeding stages and enters the new data into the input stages. The next Lamp Strobe signal then fires the lamps in accordance with the data in the stages during that shift period.

The Lamp Shift pulses on conductor 1022, the Lamp Strobe pulses on conductor 1020 and the Encoder Column Strobe signals on conductors ECS–1 through ECS–5 in the Lamp Encoder must all be precisely synchronized so that the information in the Lamp Shift Registers is properly shifted, the new information from the lamp Encoder is properly entered into the first stages of the Lamp Shift Registers, and the Lamp Operating Circuits are triggered to fire the lamps in the proper sequence to give the effect of the characters traveling across the Display Board. These signals all emanate from the Column Shift and Lamp Strobe Control circuit 226 which will be described in detail in the next following section.

The Lamp Operating Circuits LOR–1 through LOR–10 are designed so that the display may be expanded to any length desired merely by adding the Lamp Shift Registers stages, additional lamps and additional drive transistors 1002 onto the last stages of the circuits shown. For example, the Lamp Operating Circuit LOR–1 shown may be considered a module comprising any number of stages desired within the operating capabilities of the circuit components therein. Additional modules may be added by connecting conductor 1023 from the Q-output of the last stage 1024 of the shift register to the J-input of the input stage of another identical module. Appropriate connections are also made to the Lamp Shift line 1022 and Lamp Strobe line 1020 with additional line drivers (not shown) if required.

COLUMN SHIFT AND LAMP STROBE CONTROL –FIGS. 7 AND 9

This circuit along with the Variable Frequency Clock 216 synchronize the operation of all of the circuits in the system, except the Data Receiver and Series-to-Parallel Converter 204 which operates responsive to the rate of receipt of the display character data from the wire service. As previously mentioned, the clock pulses from the oscillator 715 are used to shift the information through the Buffer 206, and the Column Shift and Lamp Strobe Control which is driven by the oscillator 715 provides the Encoder Column Strobe signals to the Lamp Encoder 224 as well as the Lamp Shift and Lamp Strobe pulses to the Lamp Operating Circuits LOR-1 through LOR-10.

Figure 9:
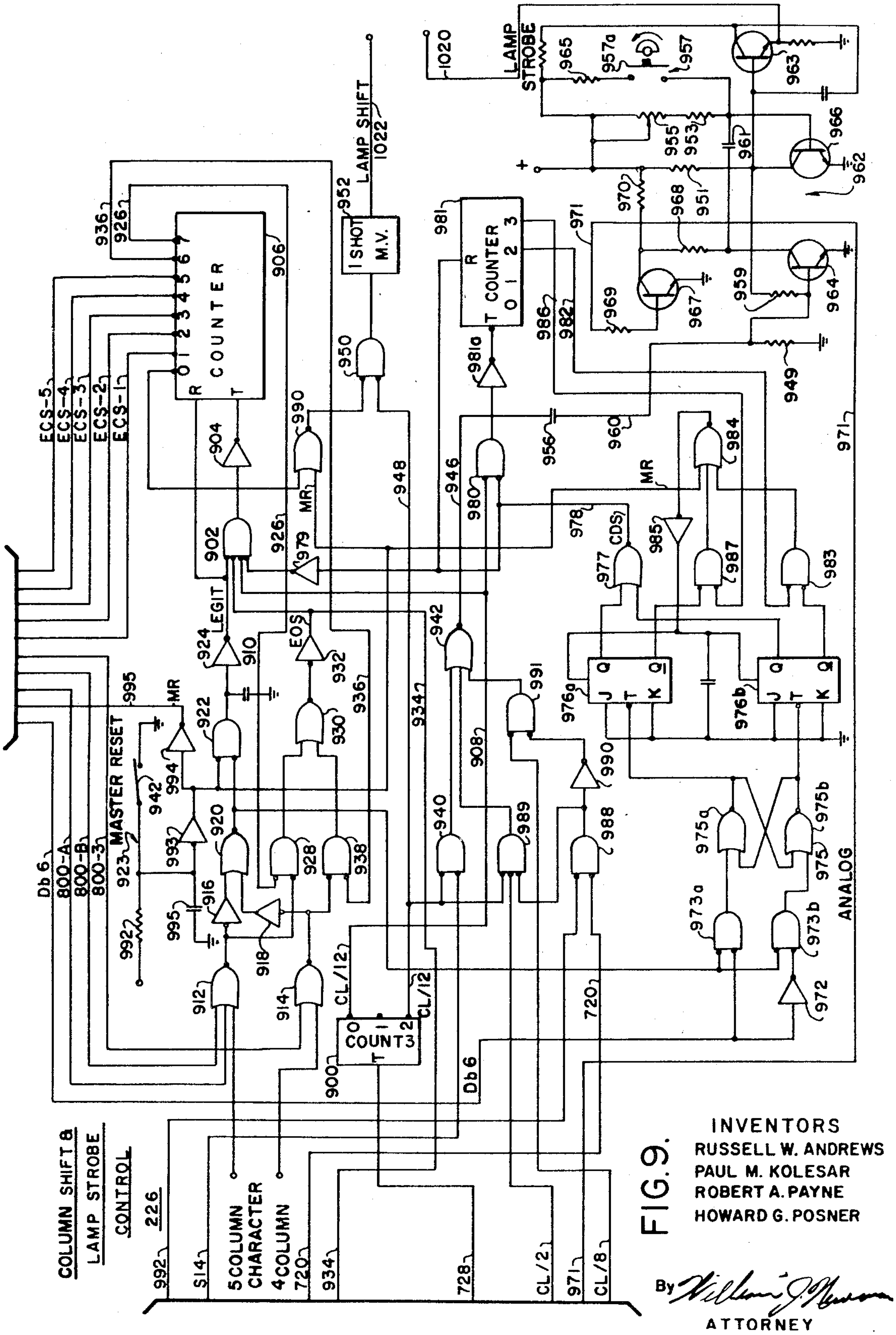

The pulses on the clock conductor 704 from the collector of the output transistor 707 of the unijunction oscillator 715 are applied to the trigger input of a flip-flop 724. Since the flip-flop 724 flips states responsive to each negative going pulse slope of the clock pulse, it provides a pulse signal having a frequency equal to the clock frequency divided by 2. This signal is provided to the trigger input of a second flip-flop 726 so that its output is a pulse signal having a frequency equal to the clock frequency divided by 4. The clock/4 pulses are transmitted via conductor 728 to a three-count counter 900 in the Column Shift and Lamp Strobe Control circuit 226 (FIG. 9). The three-count counter 900 is of a well known type which is fabricated with a pair of flip-flops and gates to continuously cycle through its O, 1, and 2 output conditions responsive to successive clock/4 pulses at its trigger input.

COLUMN SHIFTING

The count 0 output of the three-count counter 900 controls the generation of the Encoder Column Strobe pulses for reading the encoding signals out of the Lamp Encoder 224 by means of NAND-gate 902, negator 904, and an ordinary counter circuit 906 which produces output pulses successively on its output terminals 0 through 7 responsive to successive pulses at its trigger input. One input of the NAND-gate 902 is connected via conductor 908 to the 0 terminal of the three-count counter 900 so that it receives pulses at a frequency equal to the clock frequency divided by 12. The clock/12 pulses are not permitted through the gate 902, however, unless the last stages of the Buffer 206 have stored therein data relating to a display character. That is, although the second and fourth inputs to the gate 902 are normally low as will be seen hereinafter, and the third input constantly receives clock/12 pulses, the first input connected to the Legit conductor 910 is normally high to maintain the gate closed unless the last stages of the buffer carry display character data.

The display character data is detected in the buffer final stage by the Character Data Decoder 220 which, as previously described, provides a high on one of the single line character conductors 800–A, 800–B...800–3...800–*n*. If the character is a five column matrix character such as the letter A, the high signal on the appropriate single line conductor (e.g., 800–A) is received by NOR-gate 912 in the Column Shift and Lamp Strobe Control circuit 226. If it is a four-column matrix character, such as the number 3, then the character signal will be received at the input of NOR-gate 914. The NOR'd character signal from gate 912 or 914 is inverted by negator 916 or 918 and passed through gate 920, the output of which is nanded at gate 922 with the normally low signal from the Master Reset circuit 923. The output of gate 922 is inverted by negator 924 to provide a low signal to the first input of gate 902 indicating that the last stage of the buffer contains a legitimate character data code.

The clock/12 pulses are therefore passed through the gate 902 to the counter 906 to start the count from its zero condition through its successive count conditions. Thus, the first count/12 pulse passed through gate 902 causes an Encoder Column Strobe 1 low going pulse on the ECS–1 conductor to the first column of Lamp Encoder gates 820–*a*. The second clock/12 pulse causes a pulse to be sent via the ECS–2 conductor to the second column of Lamp Encoder gates 820–*b*, etc.

If the character residing in the last stage of the buffer is a five-column wide type, such as the exampled letter A, the counter 906 will continue to its count 7 condition, at which time it will provide a low signal on conductor 926 leading to one input of a NAND-gate 928. The other input of gate 928 is connected to the output of NOR-gate 912 which is in receipt of the character signals for all five column wide characters. Thus, at count 7 of counter 906, gate 928 opens and the output thereof provides through NOR-gate 930 and negator 932 a high going signal via the End of Strobe (EOS) conductor 934 to close the counter input gate 902. As will be shown shortly a shift pulse is transmitted to the Lamp Shift Registers for each Encoder Column Strobe signal sent to the Lamp encoder so that the information stored in the Lamp Shift Registers LSR–1 through LSR–10 is shifted one stage for each column strobe of the Lamp Encoder gate matrix. However, since the End of Strobe signal was produced at count 7 of the counter 906, an extra shift pulse is provided to the Lamp Shift Registers LSR–1 through LSR–10 which serves as a character spacing signal to give a single column of unlit bulbs between two characters such as shown at 122 on FIG. 1.

If the buffer last stage has stored therein the code data for a four-column matrix character such as the number 3, the End of Strobe signal would have been produced at count 6 of the counter 906 by means of the conductor 936 extending from the count 6 output to NAND-gate 938, which has at its other input the NOR-Gate 914 in receipt of the character lines for all four-column wide characters.

The End of Strobe conductor 934 is also connected to the reset terminals of each of the Buffer last stage flip-flops 600–16 through 605–16, as well as the last stage flip-flops 608–16 of the Buffer Control shift register 709 so that the high going end of strobe signal resets each of these flip-flops to their low Q-output conditions. The high on the single line character conductor from the Character Data Decoder 220 therefore disappears so that the Legit conductor 910 input to the counter input gate 902 goes high to prevent any further pulsing of the counter 906 until the next display character data is stored in the last stage of the buffer 206. The high Legit signal also resets the counter 906 to its 0 condition.

As previously mentioned a Lamp Shift pulse is transmitted via conductor 1022 to each of the Lamp Shift Registers LSR–1 through LSR–10 to shift the encoding signals therein one stage for each Encoder Column Strobe pulse sent to the Lamp Encoder from the counter 906 in the Column Shift and Lamp Strobe Control 226. The Lamp Shift pulses derive from the count 2 output of the three-count count 900. The clock/12 pulses at the count 2 terminal of counter 900 are transmitted through conductor 948 and nandgate 950 to a one-shot multivibrator 952 which generates the Lamp Shift Pulses for transmission to the Lamp Operating circuits LOR–1 through LOR–10. The gate 950 passes the clock/12 pulses to the one-shot multivibrator as long as the counter 906 is not in its zero stage. Thus, for a five-column wide display character, six pulses will be passed through the gate 950 for the character and the space before the End of Strobe signal cancels the data in the last stage of the Buffer causing the Legit conductor 910 to go high which resets the counter 906 to its 0 condition. For a four-column wide character the counter 906 resets to its 0 condition after five counts so that only five pulses are passed by the gate 950, thus providing four shift pulses to form the character and an extra shift pulse to form the space between it and the next character.

LAMP STROBING

The Lamp Strobe pulses on the strobe conductor 1020 for firing the lamps also derive from the count 2 terminal of the three-count counter 900 under normal operating circumstances. The count 2 pulses are passed through a prepared NAND-gate 940 (the purpose of which will be explained later), NOR-gate 942, capacitor 956, and conductor 960 to a controlled duty cycle multivibrator 962 from which the Lamp Strobe pulses emanate.

The controlled duty cycle multivibrator 962 comprises a pair of transistors 964, 966, each of which has its emitter connected directly to ground. The collector of transistor 964 is connected through resistors 968 and 970 to a positive voltage source, while transistor 966 has its collector connected to the voltage source through resistor 951. The base of transistor 964 receives the clock/12 pulses developed across resistor 949. The base of transistor 966 is normally connected to the positive voltage source through resistor 953 and potentiometer 955, thus rendering it normally conducting if no input pulses are received at the base of transistor 964. Transistor 964 is therefore normally off by virtue of the resistor 959 connected between its base and the collector of transistor 966. A capacitor 961 interconnects the collector of transistor 964 and the base of transistor 966, the charge on which determines the width of the output pulses of the multivibrator 962. The multivibrator pulses are transmitted through a common emitter amplifier 963 to the Lamp Strobe conductor 1020.

The voltage to which the capacitor 961 charges as well as the amount of resistance in the capacitor discharge circuit including resistor 953 and potentiometer 955 determine the width of the pulse generated by the multivibrator 962. Thus, the potentiometer 955 serves as a manual control of the Strobe pulse width and hence the brightness of the display board in accordance with the integrating phenomena experienced by the human eye, as previously discussed. The display brightness can also be caused to pulsate in a periodic manner for attention getting by means of a timer arrangement 947 including switch contacts **957*a* and resistor 965. The timer 957 can be made to periodically change the resistance value in the discharge circuit for the capacitor 961** to periodically vary the pulse width and thus cause the display to go bright and dim.

A transistor 967 having its collector connected to the junction between resistors 968 and 970, and its emitter connected to ground, is provided for controlling the voltage level to which the single-shot capacitor 961 charges. The current flow through the transistor 967 and hence the voltage drop across the resistor 970 by that current, serves as a control of the pulse width in accordance with the level of a signal on the base of the transistor 967. The level of the signal applied to the base through resistor 969 and conductor 971, hereinafter called the Analogue conductor, provides a means for controlling the brightness of the display as a function of the rate of receipt of display character data from the wire service. As will be explained later the analogue signal increases in value with increasing character data input rates so as to reduce the width of the strobe pulses. If this was not provided the brightness would increase for increases in character speed due to the normally constant pulse width output of single-shot multivibrators regardless of the frequency of the trigger pulses provided thereto. It may be that some applications of traveling message systems would require that the display be made brighter for faster character rates as an aid to the operator's reading ability. If so, the analogue signal control may be eliminated altogether or may be adjusted to give less control than would be required to maintain a constant visual brightness output.

CASE SHIFT SPACING

The Column Shift and Lamp Strobe Control circuit 226 also comprises means for providing extra spacing whenever the display characters shift from upper case to lower case or vice versa. For example, it may be seen in FIG. 1 that there is one extra column space between the upper space character B and the lower case character 3. Likewise, between the lower case character 3 and the next upper case character C two extra column spaces are provided. This extra spacing is especially desirable when there is an overlapping of the upper case and the lower case characters. Since the upper and lower case characters share the middle four or five rows of bulbs, greater spacing is needed at the shift positions to help distinguish them to the reader. If the lower case characters were displayed on a separate group of seven rows below the upper case letters, extra spacing would probably not be required. However, the provision of the extra spacing enables overlapping and saves the cost of that many lamp rows.

As previously stated, the code difference between lower case and upper case letters is in the bit b6 position of the display character code (see FIG. 4). Therefore, a case shift change requiring extra space pulses can be determined by detecting a change on the Db–6 character code line at the output of the Buffer. Therefore, the Db–6 conductor extends to the Column Shift and Lamp Strobe Control circuit 226 where it is connected directly to one input of a nandgate **973*a* and through a negator 972 to another NAND-gate 973*b*. They are NANDed in these gates with a low from the output of NOR-gate 920 which is indicative of the presence of a display character to prevent noise on the Db–6 line from generating extra space pulses. The outputs from gates 973*a* and 973*b* feed the inputs of a norgate flip-flop 975 which assumes one condition or the other dependent on the presence or absence of the Db–6 signal and shifts conditions whenever the Db bit shifts from one condition to the other. Thus, if the previous character was the capital letter B, which has a "0" in the six-bit code position, the Db–6 line would be low and the high output from gate 973*a* would have maintained the NOR-gate 975*a* in the flip-flop 975** in its low output condition. If the next character is a numeric such as the number 3, the change to a "1" in the *b6* code position indicates that it is a lower case character and the Db–6 line goes high, which, when inverted by negator 972, opens gate **973*b* to switch the flip-flop 975 from a high at the output of NOR-gate 975*b*** to a low.

The outputs from the flip-flop 975 are connected to the trigger inputs of flip-flops **976*a*, 976*b* which are adapted to change their states upon the receipt of a signal changing from a high condition to a low. The flip-flops 976*a* and *b* are normally in their reset or low Q-output condition so that the detection of the shift from the upper case letter B to the lower case number 3 causes the flip-flop 976*b* to switch to its high Q-condition, flip-flop 976*a* remaining undisturbed. The high at the Q-output of flip-flop 976*b* is NOR'd by gate 977 to provide a Case Shift Detect low going signal on conductor 978. This signal is inverted by a negator 979 and the high therefrom opens the gate 902 to inhibit the clock/12 pulses from passing through to the counter 906. This prevents the strobing of the Encoder Column Gates and the generating of the display character encoding signals. The Lamp Shift pulses and the Lamp Strobe pulses continue to be generated, however, from the count 2 output of the three-count counter 900** in the manner previously described.

The low going Column Shift Detect signal on conductor 978 also opens a gate 980 which passes clock/12 pulses from the 0 count terminal of the counter 900 to another counter 981 through an inverter 981. A low is also provided to the reset terminal of the counter 981 enabling it to start to count from its 0 condition. As soon as the counter 981 reaches its count 2 condition a low appears on conductor 982 to one input of a NAND-gate 983, the other input of which has been prepared by the low $\overline{Q}$-output of the previously set flip-flop 976b. The high output of gate 983 is NOR'd by gate 984 and reinverted to a high by negator 985 which resets the flip-flop **976*b*. This removes the Case Shift Detect signal from conductor 978 and hence the inhibiting signal to the input gate 902 of the Encoder Column Strobe counter at 906**, to permit the generation of the display character.

During the time counter 906 was inhibited and the Case Shift counter 981 was counting to its count 2 condition, the three-count counter 900 produced one clock/12 pulse at its count 2 terminal so that one Lamp Shift pulse and one Lamp Strobe pulse were sent to the lamp operating circuits LOR–1 to LOR–10 to shift the characters on the display board one column, thus providing the extra space desired between the previous letter B and the numeric character 3.

If the character shift had been from a low case characters such as the numeric 3 to a upper case character such as the letter of flip-flop 976*a* would have been triggered rather than flip-flop 976*b*. In this case the Encoder Column Strobe counter 906 is inhibited until the Case Shift counter 981 reaches its count 3 condition. At that time a low appears on conductor 986 leading to NAND-gate 987 where it is NANDed with the low $\overline{Q}$ output of flip-flop 976*a* to produce through gate 984 and negator 985 a pulse for resetting the flip-flop 976a and removing the inhibition of the counter 906. The three-count counter 900 meanwhile caused the generation of two clock/12 pulses and hence two lamp shift and strobe pulses during the period the case shift counter 981 counted to its count 3 condition, thus moving the character two extra spaces before permitting the read out of the next character.

It is evident that any number of extra spaces may be provided between upper case and lower case characters merely by selecting the number of counts by the Case Shift counter 981 before the circuit is reset. This provides a highly flexible circuit to change the spacing between different character types which could have application in many other situations besides the particular stock market quotation system described herein.

BUFFER CONTROL AND VARIABLE DISPLAY RATE OPERATION – FIG. 7

The Buffer control 210 along with the Variable Frequency Clock 216 control the operation of the whole system so that the data characters may be displayed on the board at a rate determined by the rate of receipt of character data from the wire service although not synchronized therewith. It is the purpose of the Buffer Control and the Variable Frequency Clock to maintain a smooth flowing traveling message display regardless of abrupt changes in the rate of receipt of the input data.

Generally, the circuit operates in the following manner to perform this function. The display character data is entered into the Buffer 206 in the order that it is received so that the data for the first character received is shifted to the Buffer to its last stage, the next character received is stored in the next to the last buffer stage, etc. The system is constantly working on the data in the last stage of the buffer to display it on the board, and after it does so the data is cancelled out of the last stage permitting all of the data in the preceding stages to shift forward to again fill the last stage. The Buffer Control 210 controls the shifting of the data through the Buffer so that the data, as it is received, is shifted therethrough to the highest order unfilled stage permitting no gaps to appear between filled Buffer stages. The status of the various stages of the Buffer Control Shift Register 709 which indicates the presence of data in the associated Buffer stages is tested by the Variable Frequency Clock 216 and its oscillator 705 is caused to operate at a frequency determined by the number of buffer stages containing character data. The Variable Frequency Clock is designed to change its frequency in a linear manner despite abrupt changes in the character data content of the Buffer. The clock pulses from the oscillator 705 control the shift rate of data through the Buffer and also control the generation of the Encoder Column Strobe signals, the Lamp Shift pulses and the Lamp Strobe pulses in the manner hereinbefore described, thus providing the proper synchronization of the system.

The buffer Control 210 controls the flow of data through the Buffer by testing the status of the flip-flops of the Buffer Control Shift Register 709 to determine the presence of start signals therein indicating that the associated Buffer stages have display character data therein. For example, the data in the first stage of the Buffer will be transferred into stage two as long as there is no information in stage two which is indicated by a high on conductor 730 from the $\overline{Q}$-output of flip-flop 708–2. As long as there is a high on conductor 730, the stage testing NAND-gate 706–2 has a low at its output which is applied to one input of clock pulse gate 705–2. As long as the End of Strobe conductor 934 is low the clock pulses from the clock pulse line 704 are transmitted through gate 705–2 to the trigger inputs of the Buffer Control Shift Register flip-flop 708–2 and all of the second stage flip-flops in the Buffer 206. The third input to the gate 705–2 is connected to the End of Strobe conductor 934 to prevent any shifting of information through the Buffer during the time the data in the last stage of the Buffer is being cancelled in preparation for the display of the next character. The data in stage 2 will be transferred to stage 3 by the next clock pulse if not previously filled, by action of the gates 705–3 and 706–3 and will continue by succeeding clock pulses to the highest order unfilled stage.

The information in stage one will also be transferred to stage two if there is no character residing in the last stage of the Buffer even though stage 2 is filled. This is indicated by a high on conductor 732 connected to the $\overline{Q}$ output of the last stage flip-flop 715 of the Buffer Control Shift Register 709. This high ensures a low at the output of stage testing NAND-gate 706–2 which opens the clock pulse gate 705–2. This permits all of the information in the Buffer to be shifted one stage as soon as the last stage information has been read out and cleared. In addition the gate 706–2 maintains the clock pulse gate 705–2 open to shift information from stage one to stage two if there is no information in the third stage as would be represented by a high $\overline{Q}$ output of flip-flop 708–3 and a high on conductor 734. This is true in spite of the fact that all the rest of the succeeding stages, including the last stage, are filled, and this permits the Buffer to fill any stages which might possible have been skipped in the read-in procedure. As will be noted, each of the stages 3 through 15 have similar circuits including stage testing gates 706–3 through 706–15 and clock pulse gates 705–3 through 705–15.

The trigger input to the first stage of the buffer and the Buffer Control Shift Register also has a similar control circuit including gates 706–1 and 705–1, so that when the Buffer is completely filled including the first stage, the information in the Series-to-Parallel Shift Register 516 is prevented from being read into the first stage of the Buffer. The control circuit for the clock pulses to the last stage of the Buffer and the last stage flip-flop 708–16 of the Buffer Control Shift Register does not include a stage testing gate, but rather includes a Sync line connection 720 to one input of the clock pulse gate 705–16. This enables the read-in of information into the last stage as long as there is no previous information in the last stage and as long as the End of Strobe Signal is not present to cancel the information in the last stage.

These circuits thus operate to read the incoming information from the wire service into the Buffer storage 206 and immediately advance it to the last unfilled stage. The information is then read out of the buffer in the order that it is received through the Character Decoder and Lamp Encoding Circuits to the Lamp Operating Circuits for displaying the character on the board.

The Buffer Control 210 also provides the means for varying the speed of the characters across the display board in accordance with the rate of receipt of the input data. As the rate of receipt of the display character data is increased, the number of characters stored in the Buffer increases. The status of the various buffer stages may therefore be tested as an indication of the rate of receipt of the information and the clock circuit made to operate at a frequency determined by the Buffer status.

The Variable Frequency Clock 216 has a frequency determining circuit 736 which is controllable by the status of the Buffer Control Shift Register stages to provide a variable magnitude signal to the unijunction oscillator 715 which controls the frequency of its output signal. Each of the $\overline{Q}$-outputs of the Buffer Control Shift Register flip-flops 708–1 through 708–14 have a conductor S–1 through S–14 extending therefrom through a resistor 738–1 through 738–14 to the base of a transistor 740–1 through 740–14. Each of these transistors has its emitter connected to ground and its collector connected through a resistor 742–1 through 740–14 to a positive voltage source conductor 744. The output of each of the transistors is applied through a resistor 746–1 through 746–14 and a diode 748–1 to 748–14 to a signal line 750 extending to the input of a miller integrator circuit 752. The transistors 740–1 through 740–14 are normally conducting when their associated Buffer Control Shift Register stages are not filled because of the high at the Q̄-outputs. Thus, if there are no characters in the buffer, the transistors 740–1 through 740–14 are all conducting to provide the lowest voltage signal on conductor 750, as determined by the voltage divider effect of resistor 754 and potentiometer 756. As the number of characters in the Buffer stages begins to build up (from stage 16 towards stage 1), the transistors begin to drop out, which effectively adds resistive shunts around potentiometer 756 by the circuits including resistors 742–1 through 14, resistors 746–1 through 14 and diodes 748–1 through 14. The level of the signal on conductor 750 at the input to the miller integrator 752, therefore, increases in steps as more stages are filled.

The miller integrator 752 operates in a well known manner to smooth the step function changes at its input to linear changes at its output conductor 758. The current output of transistor amplifier 760, fed by conductor 758, changes in accordance with the changes in the output of the miller integrator so as to vary the current input to the unijunction oscillator 715. The unijunction oscillator 715 is also of the basic relaxation oscillator type with its two base elements, respectively, connected through resistors 762 and 764 to the positive voltage source and ground. The unijunction emitter circuit comprises a capacitor 766 which is chargeable in a well known manner to intermittently actuate the unijunction by charging towards the supply voltage to the emitter peak voltage. The charging current circuit includes a resistor 768 and the collector circuit of the transistor amplifier 760 by means of resistor 770 and diode 772. Thus the frequency of the oscillator 715 is determined by the current output of the transistor amplifier 760 which follows the voltage levels on the input conductor 750 to the miller integrator 752, but with smooth linear transitions between the levels rather than the step function changes appearing at the integrator input. The oscillator 715 of course operates as the master clock which controls the generation of the encoding signals from the display character data, the generation of the lamp shift pulses, and the generation of the lamp strobe pulses in the manner previously described. Thus, the character display rate varies in accordance with the rate of input of the wire service data, but is not in synchronism therewith. A smooth transition in display rates is made by smoothing out the step function changes resulting from changes in the number of buffer stages filled by the changing input rates.

In the stock quotation system exampled herein, in which data receipt rates vary from approximately 500 characters per minute to 900 characters per minute, the oscillator 715 is calibrated to oscillate at approximately 480 Hz. with no characters stored in the buffer by adjustment of the potentiometer 756 in the input voltage divider circuit to the integrator circuit 752. The parameters for the Variable Frequency Adjust circuit 736 have been selected so that as the input to each of the transistors 740–1 through 740–14 goes to ground (accumulative) the frequency of the oscillator and the character display rate increase as specified in the following table:

| Input | Shifts/sec. | Chara./min. | Osc. Freq. |
|---|---|---|---|
| — | 40 | 400 | 480 Hz. |
| S 14 | 45 | 450 | 540 |
| S 13 | 50 | 500 | 600 |
| S 12 | 55 | 550 | 660 |
| S 11 | 60 | 600 | 720 |
| S 10 | 65 | 650 | 780 |
| S 9 | 73 | 730 | 880 |
| S 8 | 81 | 810 | 970 |
| S 7 | 90 | 900 | 1080 |
| S 6 | 95 | 950 | 1140 |
| S 5 | 100 | 1000 | 1200 |
| S 4 | 110 | 1100 | 1320 |
| S 3 | 120 | 1200 | 1440 |
| S 2 | 130 | 1300 | 1560 |
| S 1 | 140 | 1400 | 1680 |
| S-Full | 180 | 1800 | 2160 |

The last input in the table above, marked S-Full, is provided to prevent the loss of data in case a character is received when the Buffer is filled. It is developed from the Q̄-outputs of the first stage flip-flop 708–1 of the Buffer Control Shift Register and the input flip-flop 700. If the buffer is completely full, as represented by a low on the Q̄-output of flip-flop 708–1, and if another character has been received from the wire service as indicated by the Q̄-status of input flip-flop 700, NAND-gate 774 opens to place a low on the S-Full conductor at the output of negator 776 which, through resistor 778 opens transistor 780 to cause the oscillator frequency to increase to 2100 Hz. representing a display rate of 1,800 characters per minute. The displayed characters will have the appearance of jumping several columns, but this will clear the first stage of the buffer so that the next character will not be lost.

The Analogue signal for controlling the width of the strobe pulses with respect to the character display rate is also provided by the variable frequency determining circuit 736. The analogue conductor 971 which connects to the base of the pulse width determining transistor 967 in the Lamp Strobe pulse generating single-shot multivibrator 962 is connected directly to the collector output of the transistor amplifier 760 which also controls the frequency of the unijunction oscillator 715. Thus increases in the signal level at the output of transistor 760 which cause an increase in the oscillator frequency also cause an increase in the current flow through transistor 967 and resistor 970 in the multivibrator circuit 962 which has the effect of reducing the width of the pulse output therefrom.

SLOW DOWN AND STOP STROBING – FIGS. 7 and 9

For the ordinary speeds of 500 to 900 characters per minute at which the board displays information, the strobe and shift rates are substantially greater than the flicker fusion frequency at which the human eye integrates light flashes. Therefore, the single strobe pulse per column shift operation of the Column Shift and Lamp Strobe Control circuit 226 is sufficient to produce the appearance of steady light. If, however, the shift rate falls below the flicker fusion frequency the eye will detect the lamp flashing which is disturbing to the viewer. The following described circuits permit strobing the lamps once for each shift of the encoding signals in the Lamp Shift Registers when the shift rate is above the flicker fusion frequency and twice per signal shift at operating shift rates below the flicker fusion frequency. In addition, it permits the encoded lamps to be lit when the data input ceases so that the character appearing on the board will remain lit although stopped from traveling.

Referring again to the Column Shift and Lamp Strobe Control circuit 226 (FIG. 9), the nandgate 940 previously mentioned as part of the Lamp Strobe pulse circuit has one input connected to the count 2 output of the three-count counter 900 causing the generation of a single strobe pulse for each column shift of encoding signals in the Lamp Shift Registers as long as the shift frequency is greater than approximately 45 shifts per second. The gate 940 has its other input connected to the S–14 conductor which is low as long as there is character data in the 14th stage of the Buffer 206. The table in the previous section indicates that the oscillator 715 has a frequency of 540 Hz. under this condition or a shift rate of 45 shifts per second, which is above the flicker fusion frequency for the device described.

If, however, the shift rate falls below the flicker fusion frequency as would happen if the Buffer contains data only in one, or both, of stages 15 or 16, two strobe pulses are provided for energizing the lamps twice for each column shift of the data in the lamp shift registers LSR–1 through LSR–10. A NAND-gate 988 tests the status of the last two buffer stages by input connections to the Sync conductor 720 and to the S̄–15 conductor which is connected to the Q-output of the 15th stage flipcflop 708–15 of the Buffer Control Shift Register. Thus, if there is data in one or both of stages 15 or 16, a high will appear at one or both of the inputs to gate 988 which will present a low to one input of nandgate 989. Since one of the other inputs to gate 989 receives clock /12 pulses from the count 2 output of counter 900 and the other input receives clock/2 pulses from the Q-output of flip-flop 724 in the Clock circuit 216 (FIG. 7) two pulses will pass through the gate 989 and NOR-gate 942 to the strobe pulse generating one-shot multivibrator 952 for each lamp shift pulse deriving from the clock/12 pulses emanating directly from the count 2 output of counter 900. The total duration of these pulses from the beginning of the first to the end of the second is of course substantially less than the period of the shift frequency represented by the frequency of the clock/12 pulses.

Provisions are also made to send Lamp Strobe pulses to the display lamps even through data input has stopped as evidenced by the absence of character data in the last stage of the Buffer 206 for readout to the board. If there is no information in the 15th or 16th stages of the Buffer, the two inputs to gate 988 are low, therefore providing a low through negator 990 to one input of NAND-gate 991. Gate 991 is therefore opened to clock/8 pulses received from the Q-output of a flip-flop 782 (FIG. 7) which is driven at its trigger output by clock/4 pulses on conductor 728. Since the oscillator 715 operates at approximately 480 Hz. when no information appears in the buffer, the clock/8 pulses occur at 60 Hz. to drive the strobe pulse generating circuit 962. Lamp Shift pulses are prevented from transmission over conductor 1022 to the Lamp Operating Circuits when no data appears in the buffer last stage by means of gate 950 in the Lamp Shift line. Since no character data appears in the last stage of the Buffer, a high appears on the Legit conductor 910 connected to the reset terminal of the Encoder Column Strobe counter 906. The counter 906 is made up in a well known manner so that a high on its reset terminal resets it to its count "0" condition. When the counter 906 is in its "0" count condition, a high is presented through NOR-gate 990 to the one input of gate 950 to prevent the passage of clock/12 pulses from the count 2 output of the three-count counter 900 to the Lamp Shift Pulse generating one-shot multivibrator 952. The encoding signals in the Lamp Shift Registers LSR–1 through LSR–10 are therefore stopped and the 60 Hz. Lamp Strobe pulses maintain the lamps lit for the previously appearing display characters.

MASTER RESET – FIGS. 5, 6, 7, 8, 9, 10, and 11

The system includes Master Reset circuitry 923 by which information can be cleared from the system storage circuits to erase or turn off any lamps which are lit on the display board. For example, in its application in a stock quotation ticker display, it is desirable that the board be clear of any fired lamps when turned on in the morning prior to the stock trading session. The power to the system may be turned on prior to the session and all the lamps extinguished while waiting for the stock quotations to appear.

The master Reset control 923 comprises a switch 942 (FIG. 9) which is operable to place the correct voltage on the reset terminals of various components in the system. When the Master Reset switch 942 is in its nonactuated position as shown in FIG. 9 low voltage is presented to the reset terminals of all of the flip-flops in the Buffer Shift Registers 600 through 605 via the circuit from positive voltage including resistor 992, negator 993, negator 994, conductor 995, and the various negator circuits 615 in the Buffer Storage Circuit 206 (FIG. 6). The low voltage on the reset terminals of the Buffer flip-flop circuits permit the transfer of the character data signals therethrough. The nonactuated Master Reset circuit also presents low voltage from the outputs of negator 993 to one input of the nandgate 922 in the Legit Data Character signal input circuit to the Encoder Column Strobe Counter 906 and to norgate 984 in the Case Shift circuit. Furthermore, low voltage is presented to the flip-flop 560 of the reset circuit 558 in the Series to Parallel Converter 204 by means of negator 616 having its input connected to conductor 995 and by means of conductor 570 previously mentioned in the description of the Data Receiver and Series-to-Parallel Converter.

When it is desired to cancel all of the display character data and the encoding signals in the system, the master reset switch 942 is actuated. A high voltage pulse is thereby provided to the reset terminals of each of the flip-flops in the Buffer circuit 206. The capacitor 995 maintains a minimum length pulse for performing the reset function regardless of the time the switch 942 is actuated.

The master reset pulse cancels any data in the last stage of the Buffer so that no encoding signals are provided to the input of the Lamp Shift Registers LSR–1 through LSR–10. Lamp shift pulses are, however, provided to the Lamp Shift Register during Master Reset in order to clear all of the storage flip-flops therein to their low Q-conditions and extinguish any lamps that have been fired. The Lamp Shift pulses originate from the oscillator 715 in the Variable Frequency Clock 216 and a substantially higher oscillator frequency is sued to ensure that all of the stages in the Lamp Shift Registers are cleared during the Master Reset pulse. The oscillator operates at the higher frequency by means of transistor 785 (FIG. 7) which functions in somewhat the same manner as transistors 740–1 through 740–14 to vary the charging current for capacitor 766 in the unijunction oscillator circuit 715. Transistor 785 has its emitter connected to positive voltage through resistor 786. The base is connected through resistor 788 to the Master Reset conductor 995 so that during normal operation the transistor 785 is conducting and therefore has no effect on the unijunction oscillator. During the Master Reset function, however, a low is provided to the transistor base turning it off, and thus providing additional charging current to the oscillator capacitor 766 through the circuit from positive voltage including resistor 786, the collector of transistor 585, diode 790, conductor 971, resistor 770, and diode 772. The component values of the prototype circuit were chosen so that the oscillator operates at a frequency of, for example, 48 to 60 kHz. The clock/12 pulses at the count 2 output of the three-count counter 900 in the Column Strobe Shift and Lamp Control circuit 226, therefore produce Lamp Shift pulses on conductor 1022 at a frequency of 4 to 5 kHz. The clock/12 pulses are passed through gate 950 to the one-shot multivibrator 942 forming the Lamp Shift pulses by means of the high Master Reset pulse at the output of negator 993 and transmitted to one input of gate 950 through conductor 997 and NOR'd to a low signal by gate 990.

The Lamp Encoder gate columns 820–A through 820–E are not strobed during Master Reset because of the absence of display character data in the last stage flip-flops 600–16 through 605–16 in the Buffer. This provides a high on the Legit conductor 910 at one input to the Encoder Column Strobe enabling gate 902 to prevent operation of the counter 906. The LR–1 through LR–10 conductors all remain low during Master Reset so that all of the flip-flops in the Lamp Shift Registers are shifted to their low Q-state. Any lamps that might have been fired are therefore extinguished and the board remains blank until character data is received from the input source.

While there has been described herein a specific embodiment of a traveling message display system, many modifications and additions may be made thereto without departing from the features of this invention. It is therefore intended to be limited only by the scope of the appending claims.

What is claimed is:

1. In a traveling information display system for displaying characters in dot matrix form on a matrix of short decay transient lamps arranged in a plurality of rows and a plurality of columns, a storage device associated with each row of lamps, each of said storage devices having a plurality of storage stages at least equal to the number of said columns and adapted to cause each of said display lamps to operate with the presence of a signal therein, a display signal encoder comprising a matrix of elements for providing encoding signals arranged in rows corresponding to said rows of lamps and in a number of columns sufficient to display any desired character, means connecting each row of encoder elements to the input of the associated storage device to provide encoding signals to be read out thereto, means for receiving display data, means responsive to the receipt of said display data for preparing certain elements in said encoder matrix for the generation of encoding signals to be read out dependent on the particular character to be displayed, means for sequentially strobing each of said columns of encoder elements at a column by column display shift frequency to read out the prepared elements for each row therein and provide encoding signals to the associated row inputs of said storage devices corresponding to the prepared elements, and means for shifting the encoding signals so read out in said storage devices to actuate said device in accordance with said encoding signals sequentially from column to column at said column by column display shift frequency.

2. In the system of claim 1 wherein means are provided for producing display device strobe pulses at said frequency to cause said display devices to actuate once for each column shift of said encoding signals, the duty cycle of said display device strobe pulses being approximately 0 to 50 percent of the period of said frequency.

3. The system of claim 1, wherein said strobe pulse producing means comprises means for varying the width of said strobe pulse as a function of changes in the rate of receipt of said input data to control the visual brightness of the display.

4. The system of claim 2, wherein said strobe pulse producing means comprises means for selectively changing the width of said strobe pulses for controlling the visual brightness of the display.

5. In the system of claim 4, wherein said pulse width selectively changing means comprises a manually operable control.

6. In the system of claim 2, wherein said strobe pulse width selectively changing means comprises means for periodically changing the width of said strobe pulses and hence the visual brightness of the display for attracting attention.

7. The system of claim 3, wherein said strobe pulse producing means comprises means for selectively changing the width of said strobe pulses for controlling the visual brightness of the display.

8. In the system of claim 7, wherein said pulse width selectively changing means comprises a manually operable control.

9. In the system of claim 7, wherein said strobe pulse width selectively changing means comprises means for periodically changing the width of said strobe pulses and hence the visual brightness of the display for attracting attention.

10. The system of claim 1, wherein said encoded element enabling means comprises a buffer storage memory having a plurality of storage stages including a first storage stage connected at said receiving means and a last stage connected to said encoder, means operable responsive to said receiving means for reading said display data into said first buffer stage, means for decoding display data in said last buffer stage to prepare said certain encoder matrix elements, means for shifting display data through said buffer, and timing means operable responsive to the time rate of receipt of display character signals for controlling the operating rate of said buffer shifting means, said encoder strobing means and said shift register shifting means.

11. In the system of claim 10, wherein means are provided for detecting a change from one type of display character to another type and causing said extra stage shifting means to change the number of extra stage shifts by a predetermined number to provide a different visual spacing between the types of display characters.

12. In the system of claim 10, wherein means are provided for producing display device strobe pulses at said frequency to cause said display devices to actuate not more than once for each column shift of said encoding signals, the duty cycle of said display device strobe pulses being substantially 0 to 50 percent of the period of said frequency.

13. The system of claim 12, wherein said strobe pulse producing means comprises means for changing the width of said strobe pulses for controlling the visual brightness of the display.

14. The system of claim 10, wherein said timing means comprises means for providing a slow and substantially linear change in the operating rates of said buffer shifting means, said encoder strobing means and said shift register shifting means.

15. The system of claim 13, wherein said timing means comprises means for providing a slow and substantially linear change in the operating rates of said buffer shifting means, said encoder strobing means and said shift register shifting means.

* * * * *